United States Patent
Yamada et al.

(10) Patent No.: US 9,532,253 B2
(45) Date of Patent: Dec. 27, 2016

(54) SYSTEMS AND METHODS FOR MULTI-CONNECTIVITY OPERATION

(71) Applicant: Sharp Laboratories of America, Inc., Camas, WA (US)

(72) Inventors: Shohei Yamada, Camas, WA (US); Zhanping Yin, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 229 days.

(21) Appl. No.: 14/038,700

(22) Filed: Sep. 26, 2013

(65) Prior Publication Data
US 2015/0085760 A1 Mar. 26, 2015

(51) Int. Cl.
H04W 4/00 (2009.01)
H04W 24/10 (2009.01)
H04W 76/02 (2009.01)
H04W 52/36 (2009.01)

(52) U.S. Cl.
CPC ........... H04W 24/10 (2013.01); H04W 52/365 (2013.01); H04W 76/02 (2013.01)

(58) Field of Classification Search
CPC ..... H04W 24/10; H04W 76/02; H04W 52/365
USPC ........................................................ 370/329
See application file for complete search history.

(56) References Cited

U.S. PATENT DOCUMENTS

| | | | | |
|---|---|---|---|---|
| 2011/0135016 A1* | 6/2011 | Ahn | ...................... | H04L 5/0037 375/259 |
| 2011/0292874 A1* | 12/2011 | Ho et al. | ........................ | 370/328 |
| 2012/0140743 A1* | 6/2012 | Pelletier | ............ | H04W 72/0453 370/335 |
| 2012/0178494 A1* | 7/2012 | Haim | .................. | H04W 52/365 455/522 |
| 2012/0207112 A1* | 8/2012 | Kim | ..................... | H04W 52/146 370/329 |
| 2012/0214537 A1* | 8/2012 | Kim | ..................... | H04W 52/365 455/522 |
| 2013/0301568 A1* | 11/2013 | Park et al. | ..................... | 370/329 |
| 2013/0336228 A1* | 12/2013 | Zhao et al. | ................... | 370/328 |
| 2014/0023010 A1* | 1/2014 | Loehr et al. | .................. | 370/329 |
| 2014/0211647 A1* | 7/2014 | Li | ................. | 370/252 |
| 2015/0036647 A1* | 2/2015 | Seok | .................... | H04B 7/2612 370/329 |

(Continued)

FOREIGN PATENT DOCUMENTS

WO 2012044850 4/2012

OTHER PUBLICATIONS 36.300 v.11.6.0 Evolved Universal Terrestrial Radio Access (E-UTRA) and Evolved Universal Terrestrial Radio Access Network (E-UTRAN); Overall description; Stage 2 (Release 11), Jun. 2013.

(Continued)

*Primary Examiner* — Faisal Choudhury
(74) *Attorney, Agent, or Firm* — Austin Rapp & Hardman

(57) ABSTRACT

A method for sending a power headroom report (PHR) by a User Equipment (UE) is described. The method includes obtaining a value of a power headroom for each activated serving cell with configured uplink corresponding to a second radio connection. The method also includes generating an extended power headroom MAC control element based on the obtained values and information related to power management corresponding to a first radio connection. The method further includes transmitting the extended power headroom MAC control element.

8 Claims, 16 Drawing Sheets

(56) References Cited

U.S. PATENT DOCUMENTS

2015/0071081 A1* 3/2015 Gupta ................. H04W 52/146
370/241
2015/0087296 A1* 3/2015 Kim .................... H04W 52/365
455/422.1

OTHER PUBLICATIONS

3GPP 36.321 v11.3.0, Evolved Universal Terrestrial Radio Access (E-UTRA); Medium Access Control (MAC) protocol specification, (Release 11), Jun. 2013.
36.213 v11.3.0, Evolved Universal Terrestrial Radio Access (E-UTRA); Physical layer procedures, (Release 11), Jun. 2013.
36.101 v12.0.0, Evolved Universal Terrestrial Radio Access (E-UTRA); User Equipment (UE) radio transmission and reception, (Release 12), Jul. 2013.
36.133 v12.0.0 Evolved Universal Terrestrial Radio Access (E-UTRA); Requirements for support of radio resource management (Release 12).
3GPP TR 36.932 v12.1.0 Scenarios and Requirements for Small Cell Enhancements for E-UTRA and E-UTRAN (Release 12), Mar. 2013.
RP-122033, New Study Item Description: Small Cell enhancements for E-UTRA and E-UTRAN—Higher-layer aspects, 3GPP TSG-RAN Meeting #58, Barcelona, Dec. 2012.

* cited by examiner

SYSTEMS AND METHODS FOR MULTI-CONNECTIVITY OPERATION

TECHNICAL FIELD

The present disclosure relates generally to communication systems. More specifically, the present disclosure relates to systems and methods for multi-connectivity operation.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and efficiency have been sought. However, improving communication capacity, speed, flexibility and efficiency may present certain problems.

For example, wireless communication devices may communicate with one or more devices using multiple connections. However, the multiple connections may only offer limited flexibility and efficiency. As illustrated by this discussion, systems and methods that improve communication flexibility and efficiency may be beneficial.

DETAILED DESCRIPTION

Figure 1:
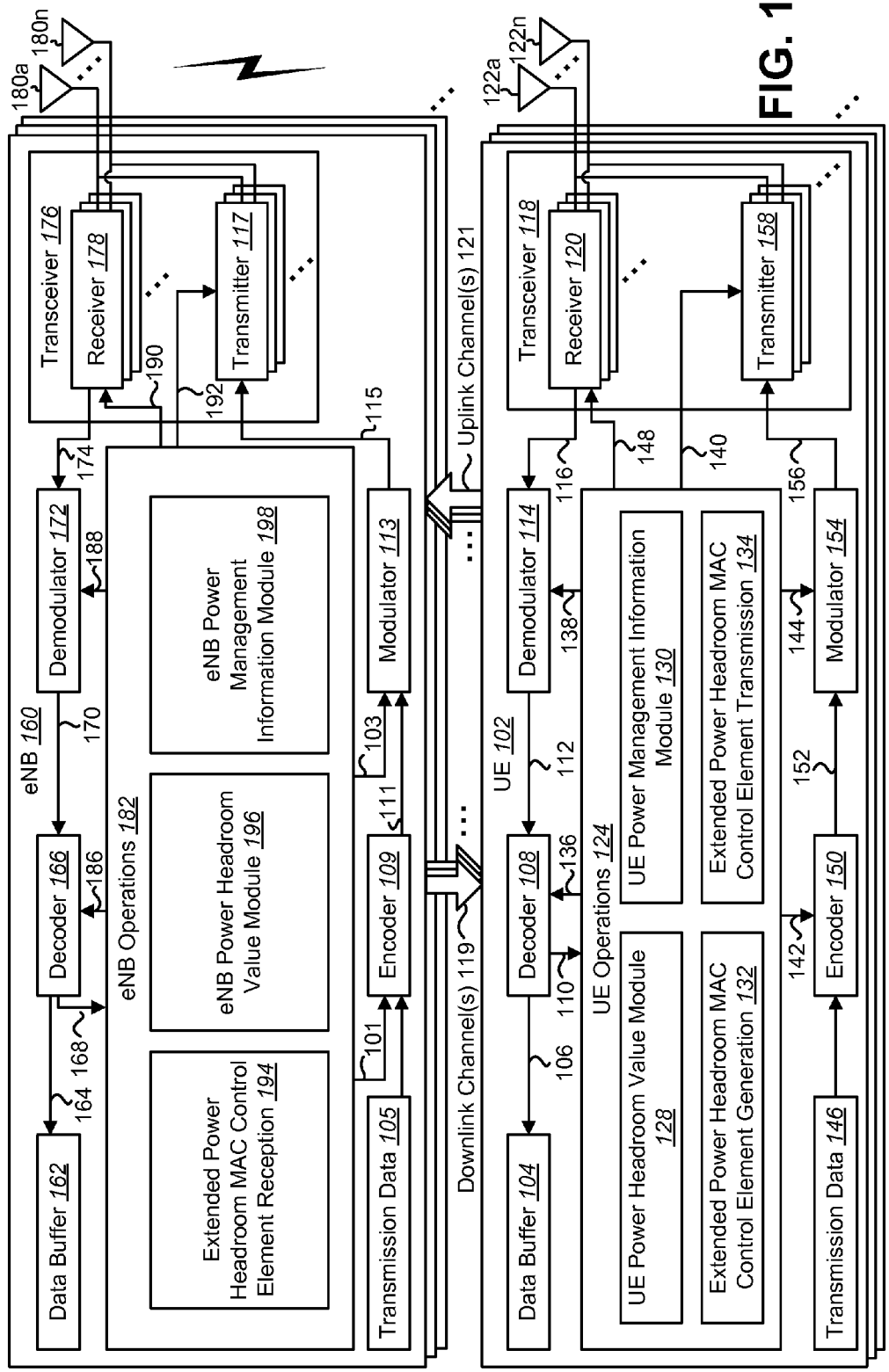
FIG. 1 is a block diagram illustrating one configuration of one or more evolved Node Bs (eNBs) and one or more user equipments (UEs) in which systems and methods for multi-connectivity operation may be implemented.

A method for sending a power headroom report (PHR) by a user equipment (UE) is described. The method includes obtaining a value of a power headroom for each activated serving cell with configured uplink corresponding to a second radio connection. The method also includes generating an extended power headroom MAC control element based on the obtained values and information related to power management corresponding to a first radio connection. The method further includes transmitting the extended power headroom MAC control element.

The method may also include obtaining a value of a power headroom for each activated serving cell with configured uplink corresponding to the first radio connection. Different evolved Node Bs (eNBs) may schedule the first radio connection and the second radio connection.

The information related to power management corresponding to a first radio connection may include a 3GPP RAN-maximum power reduction (R-MPRc) for each activated serving cell corresponding to the second radio connection. The R-MPRc may include the value of a power backoff for an activated serving cell corresponding to the second radio connection caused by a transmission on the first radio connection. The R-MPRc corresponding to an activated serving cell may indicate an amount to reduce a maximum output power of the activated serving cell ($P_{CMAX,c}$). The R-MPRc may be applied independently of power backoff due to power management as allowed by a P-MPRc.

The extended power headroom MAC control element may include at least an R-MPRc field for each activated serving cell corresponding to the second radio connection. The extended power headroom MAC control element may include at least a P field for P-MPRc and an S field for R-MPRc.

The information related to power management corresponding to a first radio connection may include an indication of a power backoff for an activated serving cell corresponding to the second radio connection caused by a transmission on the first radio connection. The extended power headroom MAC control element may include at least the indication of a power backoff for an activated serving cell corresponding to the second radio connection caused by a transmission on the first radio connection.

A method for receiving a PHR by an eNB is also described. The method includes receiving an extended power headroom MAC control element. The method also includes obtaining a value of a power headroom for each activated serving cell with configured uplink corresponding to a second radio connection from the extended power headroom MAC control element. The method further includes obtaining information related to power management corresponding to a first radio connection from the extended power headroom MAC control element.

The method may also include obtaining a value of a power headroom for each activated serving cell with configured uplink corresponding to the first radio connection from the extended power headroom MAC control element.

A UE for sending a PHR is also described. The UE includes a processor and instructions stored in memory that is in electronic communication with the processor. The UE obtains a value of a power headroom for each activated serving cell with configured uplink corresponding to a second radio connection. The UE also generates an extended power headroom MAC control element based on the obtained values and information related to power management corresponding to a first radio connection. The UE further transmits the extended power headroom MAC control element.

An eNB for receiving a PHR is also described. The eNB includes a processor and instructions stored in memory that is in electronic communication with the processor. The eNB receives an extended power headroom MAC control element. The eNB also obtains a value of a power headroom for each activated serving cell with configured uplink corresponding to a second radio connection from the extended power headroom MAC control element. The eNB further obtains information related to power management corresponding to a first radio connection from the extended power headroom MAC control element.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, one example of a "base station" is an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed herein describe devices for multi-connectivity operation. This may be done in the context of an evolved universal terrestrial radio access network (E-UTRAN). For example, multi-connectivity operation between a user equipment (UE) and two or more eNBs on an E-UTRAN is described. In one configuration, the two or more eNBs may have different schedulers.

The systems and methods described herein may enhance the efficient use of radio resources in multi-connectivity operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single eNB is assumed to provide multiple serving cells for a UE. Even in scenarios where two or more cells may be aggregated (e.g., a macro cell aggregated with remote radio head (RRH) cells) the cells may be controlled (e.g., scheduled) by a single eNB.

However, in a small cell deployment scenario, each node (e.g., eNB, RRH, etc.) may have its own independent scheduler. To maximize the efficiency of radio resources utilization of both nodes, a UE may connect to two or more nodes that have different schedulers.

In one configuration, for a UE to connect to two nodes (e.g., eNBs) that have different schedulers, multi-connectivity between the UE and E-UTRAN may be utilized. For example, in addition to Rel-11 operation, a UE operating according to the Rel-12 standard may be configured with multi-connectivity (which may also be referred to as dual connectivity, inter-eNB carrier aggregation, multi-flow, multi-cell cluster, multi-Uu, etc.). The UE may connect to the E-UTRAN with multiple Uu interfaces, if configured. For instance, the UE may be configured to establish one or more additional radio interfaces by using one radio interface.

Hereafter, one node is referred to as master eNB (MeNB) and another node is referred to as secondary eNB (SeNB).

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more evolved Node Bs (eNBs) 160 and one or more user equipments (UEs) 102 in which systems and methods for multi-connectivity operation may be implemented. The one or more UEs 102 may communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n. It should be noted that one or more of the UEs described herein may be implemented in a signal device in some configurations. For example, multiple UEs may be combined into a single device in some implementations. Additionally or alternatively, one or more of the eNBs described herein may be implemented in a single device in some configurations. For example, multiple eNBs may be combined into a single device in some implementations. In the context of FIG. 1, for instance, a single device may include one or more UEs 102 in accordance with the systems and methods described herein. Additionally or alternatively, one or more eNBs 160 in accordance with the systems and methods described herein may be implemented as a single device or multiple devices.

The UE 102 and the eNB 160 may use one or more channels 119, 121 to communicate with each other. For example, a UE 102 may transmit information or data to the eNB 160 using one or more uplink channels 121 and signals. Examples of uplink channels 121 include a physical uplink control channel (PUCCH) and a physical uplink shared channel (PUSCH), etc. Examples of uplink signals include a demodulation reference signal (DMRS) and a sounding reference signal (SRS), etc. The one or more eNBs 160 may also transmit information or data to the one or more UEs 102 using one or more downlink channels 119 and signals, for instance. Examples of downlink channels 119 include a PDCCH, a PDSCH, etc. Examples of downlink signals include a primary synchronization signal (PSS), a Cell-specific reference signal (CRS), and a CSI reference channel (CSI-RS), etc. Other kinds of channels or signals may be used.

Each of the one or more UEs 102 may include one or more transceivers 118, one or more demodulators 114, one or more decoders 108, one or more encoders 150, one or more modulators 154, one or more data buffers 104 and one or more UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of a UE power headroom value module 128, a UE power management information module 130, an extended power headroom MAC control element generation module 132 and an extended power headroom MAC control element transmission module 134. Each one of the UE operations modules 124 may correspond to each one of radio connections. One UE operations module 124 may correspond to each one, some or all of radio connections. Each one or more of a UE power headroom value module 128, a UE power management information module 130, an extended power headroom MAC control element generation module 132 and an extended power headroom MAC control element transmission module 134 may correspond to each one of radio connections. The UE operations module 124 may include one RRC entity and one or more MAC entities.

The UE power headroom value module 128 may obtain a value of a power headroom for each activated serving cell with configured uplink corresponding to a first radio connection. For example, the UE 102 may be connected to a first eNB 160 via a first radio connection. The first eNB 160 may provide multiple serving cells. The UE 102 may be configured to transmit/receive on one or more serving cells. The one or more serving cells associated with the first radio connection may have allocated UL resources for a certain (e.g., current) transmission time interval (TTI).

For a UE 102 configured with a secondary cell (SCell) for a radio connection, the power headroom may provide a serving eNB 160 with information about the differences between the UE configured maximum output power ($P_{CMAX,c}$) and the estimated power for uplink shared channel (UL-SCH) transmission per activated serving cell c, or the estimated power for simultaneous PUSCH and PUCCH transmission on a primary cell (PCell).

The UE 102 may be connected to another (e.g., second) eNB 160 via a second radio connection. The second eNB 160 may provide multiple serving cells. The UE 102 may be configured to transmit/receive on one or more serving cells associated with the second radio connection. The different eNBs 160 may schedule the first radio connection and the second radio connection. For example, the first eNB 160 may schedule the first radio connection and the second eNB 160 may schedule the second radio connection.

The one or more serving cells associated with the second radio connection may have allocated UL resources for a certain (e.g., current) transmission time interval (TTI). The UE power headroom value module 128 may obtain a value of a power headroom for each activated serving cell with configured uplink corresponding to the second radio connection.

A power headroom report procedure may be applied to each radio connection. The UE power management information module 130 may obtain information related to power management corresponding to the other radio connection(s). In other words, the UE power management information module 130 may obtain information related to power management caused by transmission(s) by the other radio connection(s). In a first configuration, for a power headroom report procedure in a second radio connection, the information related to power management corresponding to a first radio connection may include a 3GPP RAN-maximum power reduction (R-MPRc) for each activated serving cell corresponding to the second radio connection caused by a transmission on the first radio connection.

The UE power management information module 130 may obtain one or more R-MPRc for each activated serving cell corresponding to the second radio connection. The R-MPRc may be the value of a power backoff for an activated serving cell corresponding to the second radio connection caused by a transmission on the first radio connection. The R-MPRc corresponding to an activated serving cell may indicate an amount to reduce the maximum output power of the activated serving cell ($P_{CMAX,c}$). Each serving cell associated with the second radio connection may have an R-MPRc. The R-MPRc of the serving cells may be the same or different values.

In a second configuration, for a power headroom report procedure in a second radio connection, the information related to power management corresponding to the first radio connection may include an indication of a power backoff for an activated serving cell corresponding to the second radio connection caused by a transmission on the first radio connection. In other words, the UE power management information module 130 may indicate whether a power backoff for an activated serving cell has occurred, but may not obtain the value (e.g., R-MPRc) of the power backoff.

The extended power headroom MAC control element generation module 132 may generate an extended power headroom MAC control element based on the obtained values corresponding to the second radio connection and the information related to power management corresponding to the first radio connection. In the first configuration, the extended power headroom MAC control element may include the power headroom value for each activated serving cell with configured uplink corresponding to the second radio connection. The extended power headroom MAC control element may also include the power headroom value for each activated serving cell with configured uplink corresponding to the first radio connection and for each activated serving cell with configured uplink corresponding to the second radio connections. The extended power headroom MAC control element may also include at least an R-MPRc field for each activated serving cell corresponding to the second radio connection. The extended power headroom MAC control element may include the indication of the power backoff for an activated serving cell corresponding to the second radio connection caused by a transmission on the first radio connection. In one implementation, the indication may be an S field included in the extended power headroom MAC control element. This may be accomplished as described in connection with FIG. 10.

In the second configuration, the extended power headroom MAC control element may include at least the indication of the power backoff for an activated serving cell corresponding to the second radio connection caused by a transmission on the first radio connection. In one implementation, the indication may be an S field included in the extended power headroom MAC control element. The S field may be a flag that indicates whether a power backoff has been applied to an activated serving cell. This may be accomplished as described in connection with FIG. 11.

The extended power headroom MAC control element transmission module 134 may transmit the extended power headroom MAC control element. For example, the extended power headroom MAC control element transmission module 134 may transmit the extended power headroom MAC control element to the first eNB 160, to the second eNB 160 or to both the first and second eNBs 160. The extended power headroom MAC control element may be included in a MAC protocol data unit (PDU), which may be transmitted in an uplink transmission. In one configuration, the extended power headroom MAC control element transmission module 134 may transmit, on a second radio connection, the extended power headroom MAC control element for a power headroom report procedure in the second radio connection. In other words, the power headroom report procedure may be applied to each radio connection.

The UE operations module 124 may provide information 148 to the one or more receivers 120. For example, the UE operations module 124 may inform the receiver(s) 120 when or when not to receive transmissions based on the uplink grant.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include the extended power headroom MAC control element.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, one or more data buffers 162 and one or more eNB operations modules 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180*a*-*n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a*-*n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PUSCH transmission data) that may be used by the eNB operations module 182 to perform one or more operations.

In general, the eNB operations module 182 may enable the eNB 160 to communicate with the one or more UEs 102. The eNB operations module 182 may include one or more of an extended power headroom MAC control element reception module 194, an eNB power headroom value module 196 and an eNB power management information module 198. Each one of the eNB operations modules 182 may correspond to each one of the UEs 102. One eNB operations module 182 may correspond to each one, some, or all of the UEs 102. Each one or more of an extended power headroom MAC control element reception module 194, an eNB power headroom value module 196 and an eNB power management information module 198 may corresponds to each one of the UEs 102. The eNB operations module 182 may include one RRC entity and one MAC entity for each UE 102.

The extended power headroom MAC control element reception module 194 may receive an extended power headroom MAC control element. For example, the extended power headroom MAC control element reception module 194 may receive the extended power headroom MAC control element from the UE 102 via a radio connection. The extended power headroom MAC control element may be included in a MAC PDU. The MAC PDU may be received in an uplink transmission.

The eNB power headroom value module 196 may obtain a value of a power headroom for each activated serving cell with configured uplink corresponding to a second radio connection from the extended power headroom MAC control element. The power headroom may provide the eNB 160 with information about the differences between the UE configured maximum output power ($P_{CMAX,c}$) and the estimated power for UL-SCH transmission per activated serving cell c, or the estimated power for simultaneous PUSCH and PUCCH transmission on a PCell. The eNB power headroom value module 196 may obtain the power headroom values for each activated serving cell from a PH field included in the extended power headroom MAC control element.

The eNB power management information module 198 may obtain information related to power management corresponding to a first radio connection from the extended power headroom MAC control element. In a first configuration, the information related to power management corresponding to a first radio connection may include the 3GPP RAN-maximum power reduction (R-MPRc) for each activated serving cell corresponding to the second radio connection. In other words, the eNB power management information module 198 may obtain one or more R-MPRc for each activated serving cell corresponding to the second radio connection. The R-MPRc may be the value of a power backoff for an activated serving cell corresponding to the second radio connection caused by a transmission on the first radio connection. The R-MPRc corresponding to an activated serving cell may indicate an amount to reduce a maximum output power of the activated serving cell ($P_{CMAX,c}$). Each serving cell associated with the second radio connection may have an R-MPRc. The R-MPRc of the serving cells may be the same or different values.

In this first configuration, the extended power headroom MAC control element may include at least an R-MPRc field for each activated serving cell corresponding to the second radio connection. Therefore, the eNB power management information module 198 may obtain the R-MPRc from the R-MPRc field. This may be accomplished as described in connection with FIG. 10.

In a second configuration, the information related to power management corresponding to the first radio connection may include an indication of a power backoff for an activated serving cell corresponding to the second radio connection caused by a transmission on the first radio connection. In other words, the eNB power management information module 198 may obtain an indication of whether a power backoff for an activated serving cell has occurred, but may not obtain the value (e.g., R-MPRc) of the power backoff.

In the second configuration, the extended power headroom MAC control element may include at least the indication of the power backoff for an activated serving cell corresponding to the second radio connection caused by a transmission on the first radio connection. In one implementation, the indication may be an S field included in the extended power headroom MAC control element. The S field may be a flag that indicates whether a power backoff has been applied to an activated serving cell. This may be accomplished as described in connection with FIG. 11.

The eNB operations module 182 may provide information 190 to the one or more receivers 178. For example, the eNB operations module 182 may inform the receiver(s) 178 when or when not to receive transmissions based on the DRBs and the RRC messages.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
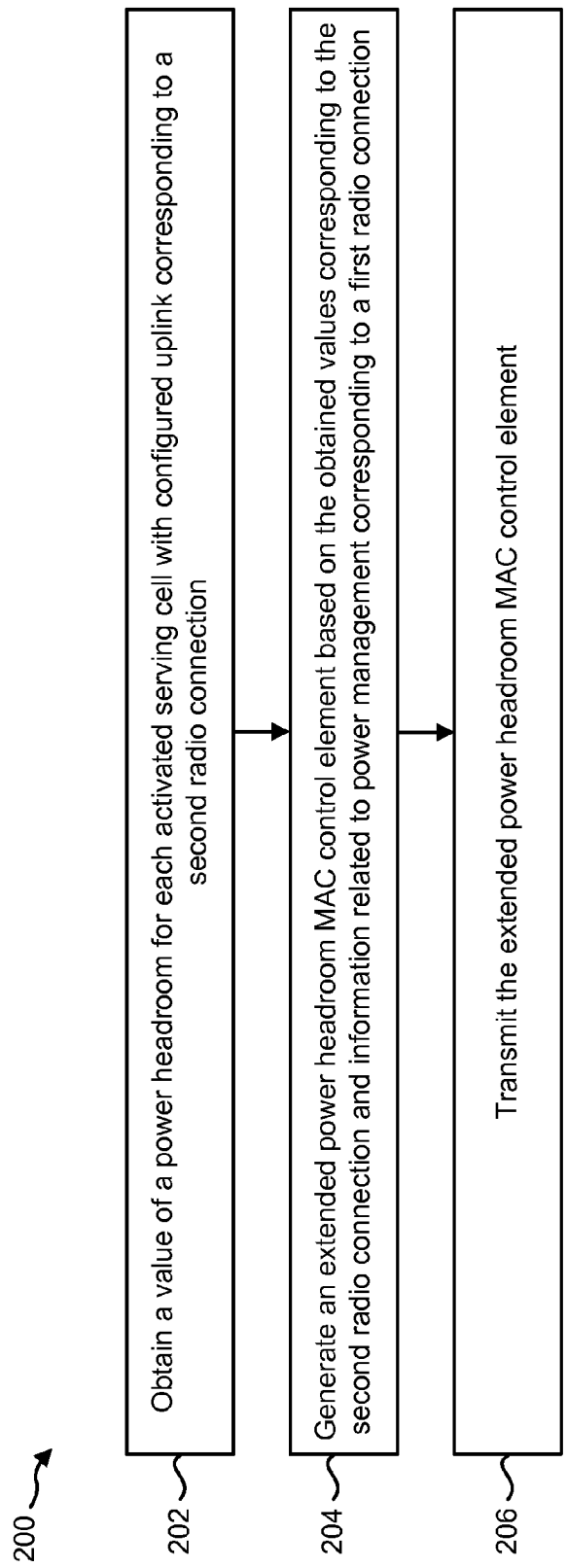
FIG. 2 is a flow diagram illustrating one implementation of a method for sending a power headroom report (PHR) by a UE.

FIG. 2 is a flow diagram illustrating one implementation of a method 200 for sending a power headroom report (PHR) by a UE 102. The UE 102 may be connected to a first eNB 160 via a first radio connection. The first eNB 160 may provide multiple serving cells. The UE 102 may be configured to transmit/receive on one or more serving cells. The one or more serving cells associated with the first radio connection may have allocated UL resources for a certain (e.g., current) transmission time interval (TTI).

For a UE 102 configured with more than one serving cell, the power headroom may provide a serving eNB 160 with information about the differences between the UE configured maximum output power ($P_{CMAX,c}$) and the estimated power for UL-SCH transmission per activated serving cell c, or the estimated power for simultaneous PUSCH and PUCCH transmission on a PCell.

The UE 102 may be connected to another (e.g., second) eNB 160 via a second radio connection. The second eNB 160 may provide multiple serving cells. The UE 102 may be configured to transmit/receive on one or more serving cells associated with the second radio connection. The different eNBs 160 may schedule the first radio connection and the second radio connection. For example, the first eNB 160 may schedule the first radio connection and the second eNB 160 may schedule the second radio connection.

The one or more serving cells associated with the second radio connection may also have allocated UL resources for a certain (e.g., current) transmission time interval (TTI). The UE 102 may obtain 202 a value of a power headroom for each activated serving cell with configured uplink corresponding to the second radio connection.

For a power headroom report procedure in the second radio connection, the UE 102 may generate 204 an extended power headroom MAC control element based on the obtained values corresponding to the second radio connection and information related to power management corresponding to the first radio connection. In a first configuration, the information related to power management corresponding to a first radio connection may include a 3GPP RAN-maximum power reduction (R-MPRc) for each activated serving cell corresponding to the second radio connection caused by a transmission on the first radio connection. In other words, the UE 102 may obtain one or more R-MPRc for each activated serving cell corresponding to the second radio connection. The R-MPRc may be the value of a power backoff for an activated serving cell corresponding to the second radio connection caused by a transmission on the first radio connection. The R-MPRc corresponding to an activated serving cell may indicate an amount to reduce a maximum output power of the activated serving cell ($P_{CMAX,c}$). Each serving cell associated with the second radio connection may have an R-MPRc. The R-MPRc of the serving cells may be the same or different values.

In this first configuration, the extended power headroom MAC control element may include the power headroom value for each activated serving cell with configured uplink corresponding to the first and second radio connections. The extended power headroom MAC control element may also include at least an R-MPRc field for each activated serving cell corresponding to the second radio connection. This may be accomplished as described in connection with FIG. 10.

In a second configuration, the information related to power management corresponding to the first radio connection may include an indication of a power backoff for an activated serving cell corresponding to the second radio connection caused by a transmission on the first radio connection. In other words, the UE 102 may indicate whether a power backoff for an activated serving cell has occurred, but may not obtain the value (e.g., R-MPRc) of the power backoff.

In the second configuration, the extended power headroom MAC control element may include at least the indication of the power backoff for an activated serving cell corresponding to the second radio connection caused by a transmission on the first radio connection. In one implementation, the indication may be an S field included in the extended power headroom MAC control element. The S field may be a flag that indicates whether a power backoff has been applied to an activated serving cell. This may be accomplished as described in connection with FIG. 11.

The UE 102 may transmit 206 the extended power headroom MAC control element. For example, the UE 102 may transmit 206 the extended power headroom MAC control element to the first eNB 160, to the second eNB 160 or to both the first and second eNBs 160. The extended power headroom MAC control element may be included in a MAC protocol data unit (PDU), which may be transmitted 206 in an uplink transmission. In one configuration, the UE 102 may transmit 206, on a second radio connection (e.g., to the second eNB 160), the extended power headroom MAC control element for a power headroom report procedure in the second radio connection. In other words, the power headroom report procedure may be applied to each radio connection.

For a power headroom report procedure in the first radio connection, it is just the other way around so that the UE 102 may generate an extended power headroom MAC control element based on the obtained values corresponding to the first radio connection and information related to power management corresponding to the second radio connection (e.g. power management caused by the second radio connection).

Figure 3:
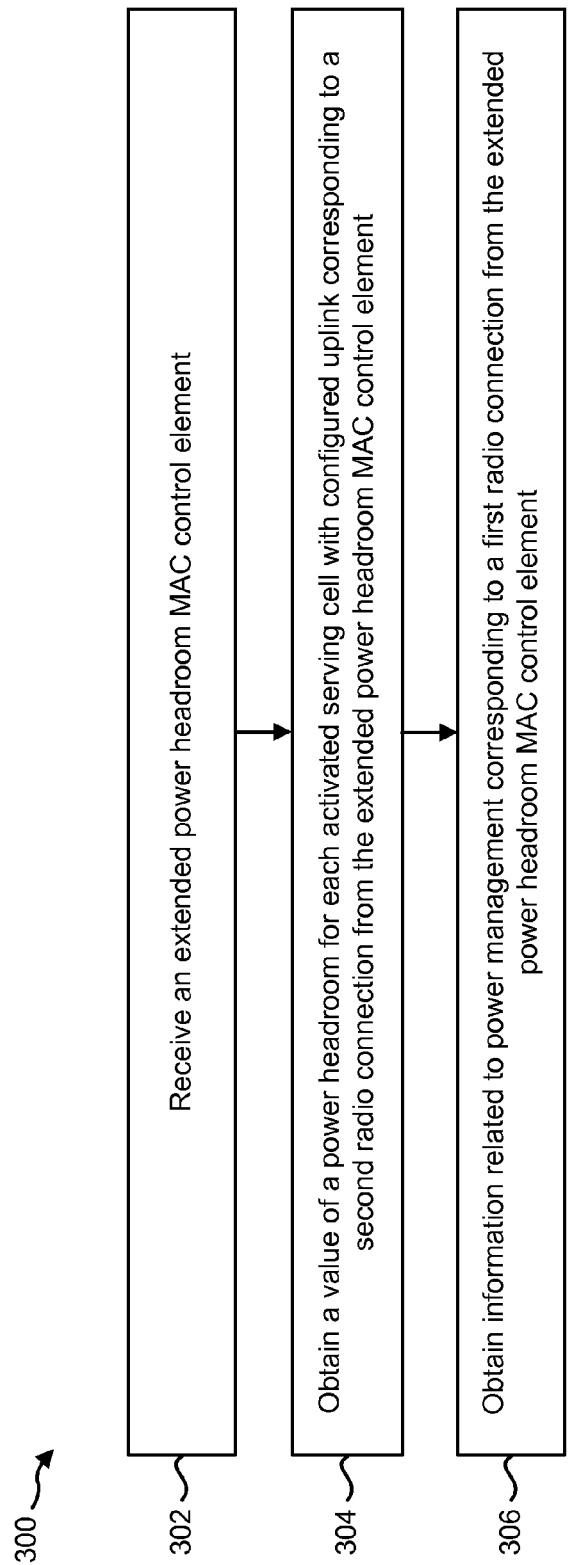
FIG. 3 is a flow diagram illustrating one implementation of a method for receiving a PHR by an eNB.

FIG. 3 is a flow diagram illustrating one implementation of a method 300 for receiving a PHR by an eNB 160. The eNB 160 may receive 302 an extended power headroom MAC control element. For example, the eNB 160 may receive 302 the extended power headroom MAC control element from a UE 102. The eNB 160 may be connected to the UE 102 via a first radio connection. The eNB 160 may provide multiple serving cells. The UE 102 may be configured to transmit/receive on one or more serving cells. The one or more serving cells associated with the first radio connection may have allocated UL resources for a certain (e.g., current) transmission time interval (TTI).

For a UE 102 configured with a secondary cell (SCell), the power headroom may provide a serving eNB 160 with information about the differences between the UE configured maximum output power ($P_{CMAX,c}$) and the estimated power for UL-SCH transmission per activated serving cell c, or the estimated power for simultaneous PUSCH and PUCCH transmission on a PCell. The eNB 160 may obtain 304 the power headroom values for each activated serving cell from a PH field included in the extended power headroom MAC control element.

The UE 102 may be connected to another (e.g., second) eNB 160 via a second radio connection. The second eNB 160 may also provide multiple serving cells. The UE 102 may be configured to transmit/receive on one or more serving cells associated with the second eNB 160. The different eNBs 160 may schedule the first radio connection and the second radio connection. For example, the eNB 160 may schedule the first radio connection and the second eNB 160 may schedule the second radio connection.

The extended power headroom MAC control element may be included in a MAC protocol data unit (PDU). The MAC PDU may be received 302 in an uplink transmission. The eNB 160 may obtain 304 a value of a power headroom for each activated serving cell with configured uplink corresponding to a second radio connection from the extended power headroom MAC control element.

The eNB 160 may obtain 306 information related to power management corresponding to a first radio connection from the extended power headroom MAC control element. In a first configuration, the information related to power management corresponding to a first radio connection may include a 3GPP RAN-maximum power reduction (R-MPRc) for each activated serving cell corresponding to the second radio connection caused by a transmission on the first radio connection. In other words, the eNB 160 may obtain 306 one or more R-MPRc for each activated serving cell corresponding to the second radio connection. The R-MPRc may be the value of a power backoff for an activated serving cell corresponding to the second radio connection caused by a transmission on the first radio connection. The R-MPRc corresponding to an activated serving cell may indicate an amount to reduce a maximum output power of the activated serving cell ($P_{CMAX,c}$). Each serving cell associated with the second radio connection may have an R-MPRc. The R-MPRc of the serving cells may be the same or different values.

In this first configuration, the extended power headroom MAC control element may include at least an R-MPRc field for each activated serving cell corresponding to the second radio connection. Therefore, the eNB 160 may obtain 306 the R-MPRc from the R-MPRc field. This may be accomplished as described in connection with FIG. 10.

In a second configuration, the information related to power management corresponding to the first radio connection may include an indication of a power backoff for an activated serving cell corresponding to the second radio connection caused by a transmission on the first radio connection. In other words, the eNB 160 may obtain 306 an indication of whether a power backoff for an activated serving cell has occurred, but may not obtain the value (e.g., R-MPRc) of the power backoff.

In the second configuration, the extended power headroom MAC control element may include at least the indication of the power backoff for an activated serving cell corresponding to the second radio connection caused by a transmission on the first radio connection. In one implementation, the indication may be an S field included in the extended power headroom MAC control element. The S field may be a flag that indicates whether a power backoff has been applied to an activated serving cell. This may be accomplished as described in connection with FIG. 11.

Figure 4:
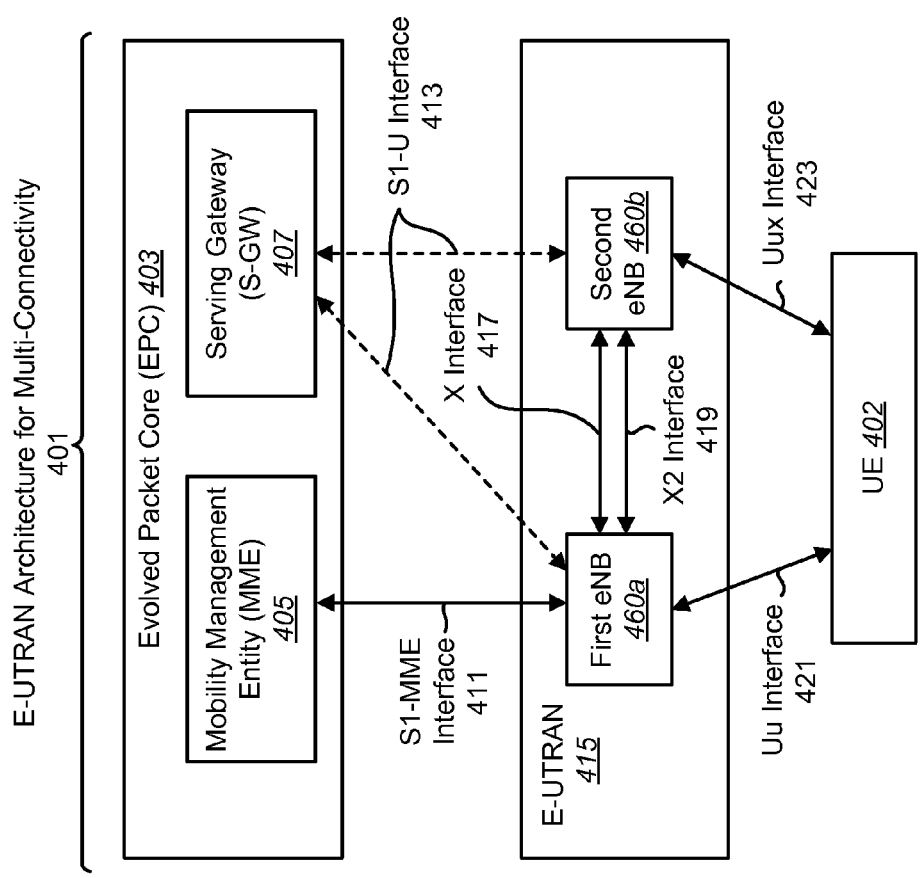
FIG. 4 is a block diagram illustrating configurations of Evolved Universal Terrestrial Radio Access Network (E-UTRAN) architecture in which systems and methods for multi-connectivity operation may be implemented.

FIG. 4 is a block diagram illustrating configurations of E-UTRAN architecture 401 in which systems and methods for multi-connectivity operation may be implemented. The UE 402 described in connection with FIG. 4 may be implemented in accordance with the UE 102 described in connection with FIG. 1. The eNBs 460a-b described in connection with FIG. 4 may be implemented in accordance with the eNB 160 described in connection with FIG. 1.

The E-UTRAN architecture for multi-connectivity 401 is one example of E-UTRAN architecture that may provide multi-connectivity for a UE 402. In this configuration, the UE 402 may connect to E-UTRAN 415 via a Uu interface 421 and a Uux interface 423. The E-UTRAN 415 may include a first eNB 460a and a second eNB 460b. The eNBs 460a-b may provide the E-UTRA user plane (PDCP/RLC/MAC/PHY) and control plane (RRC) protocol terminations toward the UE 402. The eNBs 460a-b may be interconnected with each other by an X2 interface 419. The S1 interface 411, 413 may support a many-to-many relation between MMEs 405, serving gateways 407 and eNBs 460a-b. The first eNB (e.g., MeNB) 460a and the second eNB (e.g., SeNB) 460b may also be interconnected with each other by means of one or more X interfaces 417, which may or may not be the same as the S1-MME 411 and/or X2 interface 519.

The eNBs 460 may host a variety of functions. For example, the eNBs 460 may host functions for radio resource management (e.g., radio bearer control, radio admission control, connection mobility control, dynamic allocation of resources to UEs 402 in both uplink and downlink (scheduling)). The eNBs 460 may also perform IP header compression and encryption of user data stream; selection of an MME 405 at UE 402 attachment when no routing to an MME 405 can be determined from the information provided by the UE 402; and routing of user plane data toward the serving gateway 407. The eNBs 460 may additionally perform scheduling and transmission of paging messages (originated from the MME 405); scheduling and transmission of broadcast information (originated from the MME or operation and maintenance (O&M)); measurement and measurement reporting configuration for mobility and scheduling; and scheduling and transmission of the public warning system (PWS) (which may include the earthquake and tsunami warning system (ETWS) and commercial mobile alert system (CMAS)) messages (originated from the MME 405). The eNBs 460 may further perform closed subscriber group (CSG) handling and transport level packet marking in the uplink.

The MME 405 may host a variety of functions. For example, the MME 405 may perform Non-Access Stratum (NAS) signaling; NAS signaling security; access stratum (AS) security control; inter core network (CN) node signaling for mobility between 3GPP access networks; and idle mode UE Reachability (including control and execution of paging retransmission). The MME 405 may also perform tracking area list management (for a UE 402 in idle and active mode); packet data network gateway (PDN GW) and S-GW selection; MME 405 selection for handovers with MME 405 change; and Serving GPRS Support Node (SGSN) selection for handovers to 2G or 3G 3GPP access networks. The MME 405 may additionally host roaming, authentication, and bearer management functions (including dedicated bearer establishment). The MME 405 may provide support for PWS (which includes ETWS and CMAS) message transmission, and may optionally perform paging optimization.

The S-GW 407 may also host the following functions. The S-GW 407 may host the local mobility anchor point for inter-eNB 460 handover. The S-GW 407 may perform mobility anchoring for inter-3GPP mobility; E-UTRAN idle mode downlink packet buffering and initiation of network triggered service request procedure; lawful interception; and packet routing and forwarding. The S-GW 407 may also perform transport level packet marking in the uplink and the downlink; accounting on user and QoS Class Identifier (QCI) granularity for inter-operator charging; and UL and DL charging per UE 402, packet data network (PDN), and QCI.

The radio protocol architecture of E-UTRAN 415 may include the user plane and the control plane. The user plane protocol stack may include PDCP, RLC, MAC and PHY sublayers. The PDCP, RLC, MAC and PHY sublayers (terminated at the eNB 460a on the network) may perform functions (e.g., header compression, ciphering, scheduling, ARQ and HARQ) for the user plane. PDCP entities are located in the PDCP sublayer. RLC entities are located in the RLC sublayer. MAC entities are located in the MAC sublayer. The PHY entities are located in the PHY sublayer.

The control plane may include a control plane protocol stack. The PDCP sublayer (terminated in eNB 460a on the network side) may perform functions (e.g., ciphering and integrity protection) for the control plane. The RLC and MAC sublayers (terminated in eNB on the network side) may perform the same functions as for the user plane. The RRC (terminated in eNB 460a on the network side) may perform the following functions. The RRC may perform broadcast functions, paging, RRC connection management, radio bearer (RB) control, mobility functions, UE 402 measurement reporting and control. The NAS control protocol (terminated in MME 405 on the network side) may perform, among other things, evolved packet system (EPS) bearer management, authentication, evolved packet system connection management (ECM)-IDLE mobility handling, paging origination in ECM-IDLE and security control.

The first eNB 460a and the second eNB 460b may be connected by the S1 interface 411, 413 to the EPC 403. The first eNB 460a may be connected to the MME 405 by the S1-MME interface 411. In one configuration, the second eNB 460b may be connected to the serving gateway 407 by the S1-U interface 413 (as indicated by a dashed line). The first eNB 460a may behave as the MME 405 for the second eNB 460b so that S1-MME interface 411 for the second eNB 460b may be connected (via the X interface 417, for instance) between the first eNB 460a and the second eNB 460b. Therefore, the first eNB 460a may appear to the second eNB 460b as an MME 405 (based on the S1-MME interface 411) and an eNB 460 (based on the X2 interface 419).

In another configuration, first eNB 460a may also be connected to the serving gateway 407 by the S1-U interface 413 (as indicated by a dashed line). Therefore, the second eNB 460b may not be connected to the EPC 403. The first eNB 460a may appear to the second eNB 460b as an MME 405 (based on the S1-MME interface 411), an eNB (based on the X2 interface 419), and an S-GW 407 (based on the S1-U interface 413). This architecture 401 may provide a single node S1 interface 411, 413 (e.g., connection) with the EPC 403 for the first eNB 460a and the second eNB 460b. By the single node connection with EPC 403, MME 405 S-GW 407, a change (e.g., handover) could be mitigated as long as the UE 402 is in the coverage of the first eNB 460a.

Figure 5:
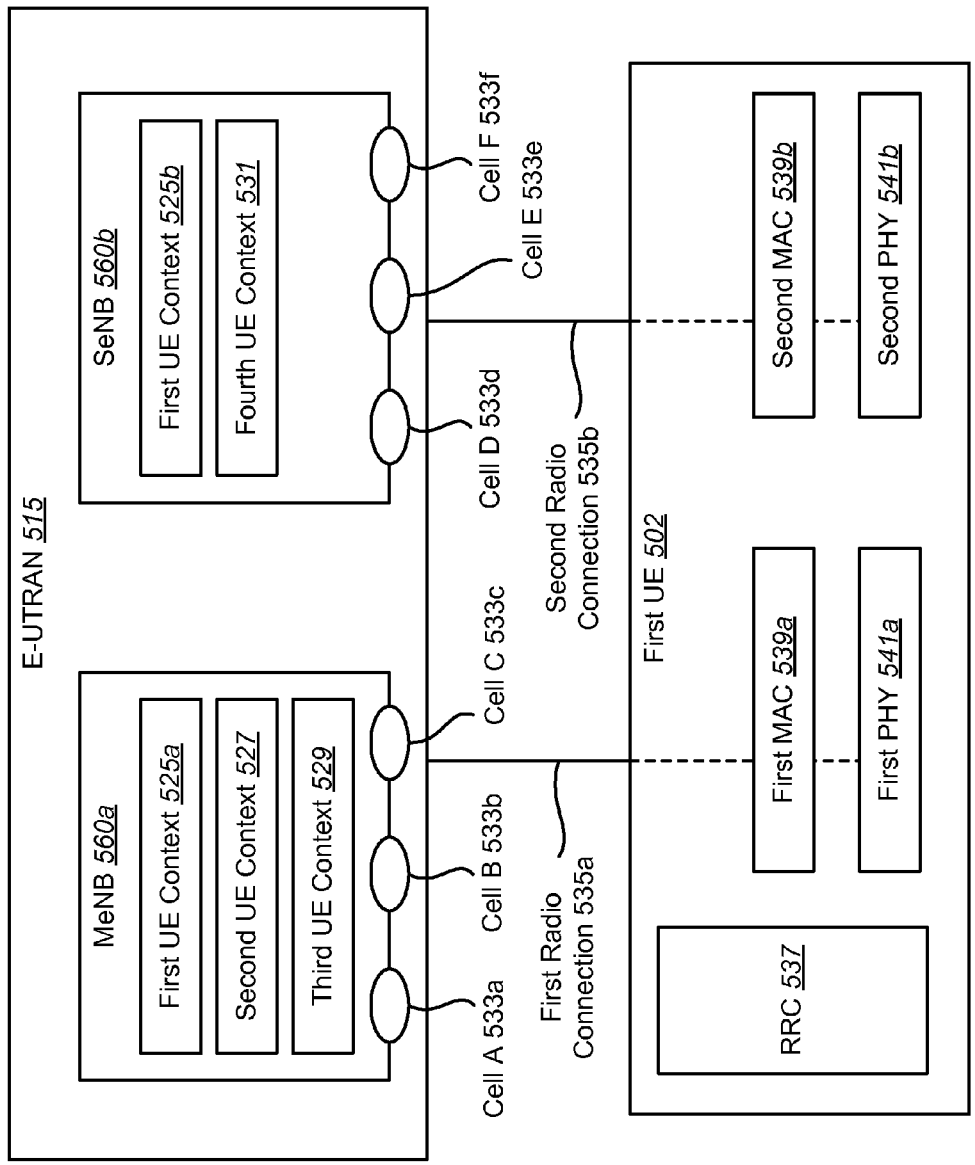
FIG. 5 is a block diagram illustrating one configuration of an E-UTRAN and a UE in which systems and methods for multi-connectivity operation may be implemented.

FIG. 5 is a block diagram illustrating one configuration of an E-UTRAN 515 and a UE 502 in which systems and methods for multi-connectivity operation may be implemented. The UE 502 and the E-UTRAN 515 described in connection with FIG. 5 may be implemented in accordance with corresponding elements described in connection with at least one of FIGS. 1 and 4.

In carrier aggregation, a single eNB 560 is typically assumed to provide multiple serving cells for a UE 502. For example, in a network with one or more remote radio heads (RRH), the one or more RRHs are controlled by the single eNB 560. However, in a small cell deployment scenario, each eNB 560 (e.g., node) may have its own independent scheduler. To utilize radio resources of both eNBs 560, the UE 502 may connect to both eNBs 560.

When carrier aggregation is configured, the UE 502 may have one RRC connection with the network. One radio interface may provide carrier aggregation. During RRC connection establishment, re-establishment and handover, one serving cell 533 may provide NAS mobility information (e.g., a tracking area identity (TAI)). During RRC connection re-establishment and handover, one serving cell 533 may provide a security input. This cell 533 may be referred to as the primary cell (PCell). In the downlink, the component carrier corresponding to the PCell may be the downlink primary component carrier (DL PCC), while in the uplink it may be the uplink primary component carrier (UL PCC).

Depending on UE capabilities, one or more SCells may be configured to form together with the PCell a set of serving cells. In the downlink, the component carrier corresponding to a SCell may be a downlink secondary component carrier (DL SCC), while in the uplink it may be an uplink secondary component carrier (UL SCC).

The configured set of serving cells 533 for the UE 502, therefore, may consist of one PCell and one or more SCells. For each SCell, the usage of uplink resources by the UE 502 (in addition to the downlink resources) may be configurable. The number of DL SCCs configured may be larger than or equal to the number of UL SCCs and no SCell may be configured for usage of uplink resources only.

From a UE 502 viewpoint, each uplink resource may belong to one serving cell 533. The number of serving cells 533 that may be configured depends on the aggregation capability of the UE 502. The PCell may only be changed using a handover procedure (e.g., with a security key change and a random access channel (RACH) procedure). The PCell may be used for transmission of the PUCCH. Unlike the SCells, the PCell may not be de-activated. Re-establishment may be triggered when the PCell experiences radio link failure (RLF), not when the SCells experience RLF. Furthermore, NAS information may be taken from the PCell.

The reconfiguration, addition and removal of SCells may be performed by RRC 537. At intra-LTE handover, RRC 537 may also add, remove or reconfigure SCells for usage with a target PCell. When adding a new SCell, dedicated RRC signaling may be used for sending all required system information of the SCell (e.g., while in connected mode, UEs 502 need not acquire broadcasted system information directly from the SCells).

However, to connect to both eNBs 560 that have different schedulers, multi-connectivity between the UE 502 and E-UTRAN 515 may be required. In addition to Release-11 operation, a UE 502 operating according to Release-12 may be configured with multi-connectivity (which may also be called dual-connectivity, inter-node carrier aggregation, inter-node radio aggregation, multi-flow, multi-cell cluster, multi-Uu, etc.).

The UE 502 may connect to E-UTRAN 515 with multiple Uu interfaces 421, 423, if configured. For example, a UE 502 may be configured to establish an additional radio interface (e.g., radio connection 535) by using one radio interface (radio connection 535). Hereafter, one eNB 560 is referred to as a master eNB (MeNB) 560a, which may also be called a primary eNB (PeNB). Another eNB 560 is referred to as a s secondary eNB (SeNB) 560b. The Uu interface 421 (which may be called primary Uu interface) is a radio interface between the UE 502 and the MeNB 560a. The Uux interface 423 (which may be called secondary Uu interface) is a radio interface between the UE 502 and the SeNB 560b.

In one configuration, the UE 502 may not be required to be aware of the MeNB 560a and SeNB 560b as long as the UE 502 is aware of multiple Uu interfaces 421, 423 with the E-UTRAN 415. Also, the E-UTRAN 415 may provide multiple Uu interfaces with the same or different eNBs 560.

In one configuration, the MeNB 560a and SeNB 560b could be the same eNB 560. The multiple Uu interfaces 421, 423 (e.g., multi-connectivity) can be achieved even by a single eNB 560. The UE 502 may be able to connect more than one Uux interface 423 (e.g., Uu1, Uu2, Uu3 . . . ). Each Uu interface 421, 423 can have carrier aggregation. Therefore, the UE 502 may be configured with more than one set of serving cells in case of CA.

Multiple Uu interfaces 421, 423 are described herein, but this functionality could be realized by a single Uu interface 421 depending on the definition of Uu interface 421. Multi-connectivity may be realized by a single Uu interface 421 or a single radio interface depending on the definition of the interface. A radio interface can be defined as an interface between a UE 502 and the E-UTRAN 515, but not an interface between the UE 502 and an eNB 560. For example, one radio interface can be defined as an interface between a UE 502 and the E-UTRAN 515 with multi-connectivity. Therefore, the difference between the Uu 421 and Uux 423 above may be considered as a characteristic of cells. The Uu interface 421 and the Uux interface 423 may be rephrased by a set A of cell(s) and a set B of cell(s), respectively. Also, a radio interface and an additional radio interface can be rephrased by a set A of cell(s) and a set B of cell(s), respectively.

In some implementations, the E-UTRAN 515 may include a MeNB 560a and a SeNB 560b. The UE 502 may communicate with the MeNB 560a via a first radio connection 535a. The UE 502 may communicate with the SeNB 560b via the second radio connection 535b. While FIG. 5 depicts one first radio connection 535a and one second radio connection 535b, the UE 502 may be configured with one first radio connection 535a and one or more second radio connections 535b. The MeNB 560a and SeNB 560b may be implemented in accordance with the eNB 160 described in connection with FIG. 1.

The MeNB 560a may provide multiple cells 533a-c for connection to one or more UEs 502. For example, the MeNB 560a may provide cell A 533a, cell B 533b and cell C 533c. Similarly, the SeNB 560b may provide multiple cells 533d-f. The UE 502 may be configured to transmit/receive on one or more cells (e.g., cell A 533a, cell B 533b and cell C 533c) for the first radio connection 535a (e.g., a primary Uu interface). The UE 502 may also be configured to transmit/receive on one or more other cells (e.g., cell D 533d, cell E 533e and cell F 533f) for the second radio connection 535b (e.g., a secondary Uu interface). If the UE 502 is configured to transmit/receive on multiple cells 533a-f for a radio connection 535a-b, a carrier aggregation operation may be applied to the radio connection 535a-b. In one configuration, each radio connection 535 may be configured with a primary cell and no, one, or more secondary cell(s). In another configuration, at least one radio connection 535 may be configured with a primary cell and no, one, or more secondary cell(s) and the other radio connections 535 may be configured with one or more secondary cell(s).

One MAC entity 539 and one PHY entity 541 may be mapped to one radio connection 535. For example, a first MAC entity 539a and a first PHY entity 541a may be mapped to the first radio connection 535a. Similarly, a second MAC entity 539b and a second PHY entity 541b may be mapped to the second radio connection 535b. The UE 502 may be configured with one primary radio connection 535 (e.g., the first radio connection 535a) and optionally one or more secondary radio connections 535 (e.g., the second connection 535b).

The MeNB 560a manages and stores UE contexts for the first radio connection 535a. The UE contexts may be RRC contexts (e.g., configurations, configured cells, security information, etc.), QoS information and UE 502 identities for each UE 502 for configured cells for the UE 502. For example, the MeNB 560a may manage and store a first UE context 525a, a second UE context 527 and a third UE context 529.

The SeNB 560b manages and stores UE contexts for the second radio connection 535b for each UE 502 for configured cells for the UE 502. For example, the SeNB 560b may manages and store the first UE context 525b and a fourth UE context 531. An eNB 560 can behave as both MeNB 560a and SeNB 560*b*. Therefore, the eNB 560 may manage and store UE contexts for UEs 502 connected to a first radio connection 535*a* and UE contexts for UEs 502 connected to a second radio connection 535*b*.

In some implementations, the MAC entities 539*a-b* may have an interface with an RRC entity 537. The RRC entity 537 may receive RRC messages (e.g., RRC connection reconfiguration message, connection control message, handover command, etc.) from a RRC entity (not shown) of the E-UTRAN 515. The RRC entity 537 may also transmit RRC messages (e.g. RRC connection reconfiguration complete message) to the RRC entity (not shown) of the E-UTRAN 515.

Figure 6:
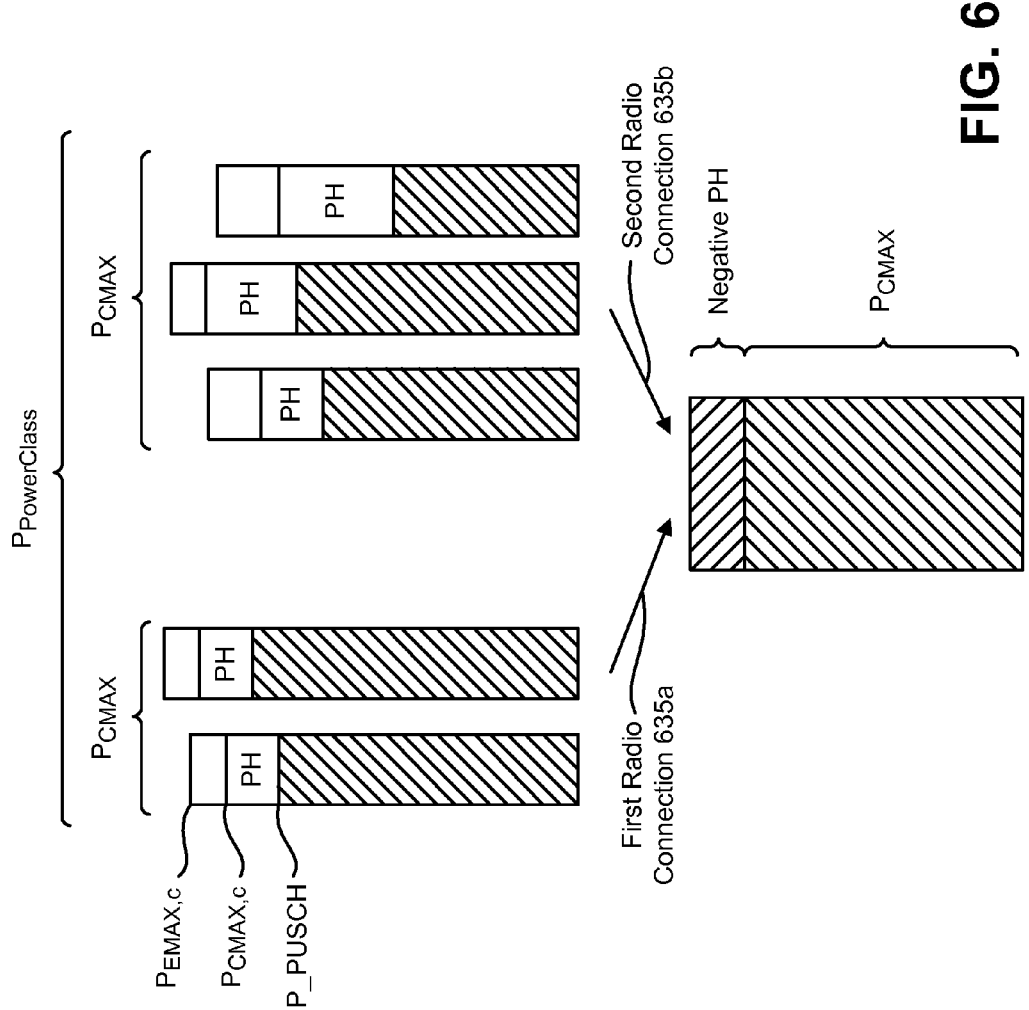
FIG. 6 is a block diagram illustrating one configuration of power headroom (PH) reporting.

FIG. 6 is a block diagram illustrating one configuration of power headroom (PH) reporting. FIG. 6 shows the issue that a Release-11 based PHR could not avoid lack of power headroom (PH) when multiple radio connections 535 are configured. Firstly, a power headroom report in a radio connection is explained. A power headroom reporting procedure may be used to provide a serving eNB 160 with information about the difference between the nominal UE 102 maximum transmit power and the estimated power for UL-SCH transmission per activated serving cell 533 and also with information about the difference between the nominal UE 102 maximum power and the estimated power for UL-SCH and PUCCH transmission on a PCell.

In one configuration, RRC 537 may control power headroom reporting by configuring the two timers periodicPHR-Timer and prohibitPHR-Timer, and by signaling dl-PathlossChange, which sets the change in measured downlink pathloss and a required power backoff due to power management (as allowed by P-MPRc) to trigger a power headroom report (PHR).

A PHR may be triggered if any of the following events occur. If prohibitPHR-Timer expires or has expired and the path loss has changed more than dl-PathlossChange dB for at least one activated serving cell 533, which is used as a pathloss reference since the last transmission of a PHR when the UE has UL resources for new transmission. If periodicPHR-Timer expires. Upon configuration or reconfiguration of the power headroom reporting functionality by upper layers, which is not used to disable the function. Activation of an SCell with configured uplink.

A PHR may also be triggered if the prohibitPHR-Timer expires or has expired, when the UE 102 has UL resources for new transmission, and the following is true in a TTI for any of the activated serving cells 533 with configured uplink. If there are UL resources allocated for transmission or there is a PUCCH transmission on this cell, and the required power backoff due to power management (as allowed by P-MPRc) for a particular cell has changed more than dl-PathlossChange dB since the last transmission of a PHR when the UE 102 had UL resources allocated for transmission or PUCCH transmission on this cell.

It should be noted that the UE 102 may avoid triggering a PHR when the required power backoff due to power management decreases only temporarily (e.g., for up to a few tens of milliseconds) and the UE 102 may avoid reflecting such a temporary decrease in the values of $P_{CMAX,c}$ or PH when a PHR is triggered by other triggering conditions.

A power headroom reporting procedure according to a known approach is summarized in Listing (1). The extended power headroom MAC control element is discussed in more detail in connection with FIG. 10 and FIG. 11.
If the UE has UL resources allocated for new transmission for this TTI:

If it is the first UL resource allocated for a new transmission since the last MAC reset, start periodicPHR-Timer;
If the power headroom reporting procedure determines that at least one PHR has been triggered and not cancelled, and;
If the allocated UL resources can accommodate a PHR MAC control element plus its subheader if extendedPHR is not configured, or the Extended PHR MAC control element plus its subheader if extendedPHR is configured, as a result of logical channel prioritization:
    If extendedPHR is configured:
        For each activated serving cell with configured uplink:
            Obtain the value of the Type 1 power headroom;
            If the UE has UL resources allocated for transmission on this serving cell for this TTI:
                Obtain the value for the corresponding $P_{CMAX,c}$ P field from the physical layer;
        If simultaneousPUCCH-PUSCH is configured:
            Obtain the value of the Type 2 power headroom for the PCell;
            If the UE has a PUCCH transmission in this TTI:
                Obtain the value for the corresponding $P_{CMAX,c}$ field from the physical layer;
        Instruct the multiplexing and assembly procedure to generate and transmit an extended PHR MAC control element based on the values reported by the physical layer;
    Else:
        Obtain the value of the Type 1 power headroom from the physical layer; Instruct the multiplexing and assembly procedure to generate and transmit a PHR MAC control element based on the value reported by the physical layer;
    Start or restart periodicPHR-Timer;
    Start or restart prohibitPHR-Timer;
    Cancel all triggered PHR(s).

Listing (1)

For a UE 102 that is not configured with a secondary cell, the power headroom provides the serving eNB 160 with information about the differences between the UE 102 configured maximum output power ($P_{CMAX,c}$) and the estimated power for UL-SCH transmission of the serving cell 533. In this case, the UE 102 may meet requirements for power headroom Type 1. For a UE 102 configured with a secondary cell, the power headroom may provide the serving eNB 160 with information about the differences between the UE 102 configured maximum output power ($P_{CMAX,c}$) and the estimated power for UL-SCH transmission per activated serving cell c, or the estimated power for simultaneous PUSCH and PUCCH transmission on a PCell. In this case, the UE 102 may meet requirements for both power headroom Type 1 and Type 2.

The reported power headroom may be estimated over 1 subframe. When extendedPHR is not configured, the Type 1 power headroom may be estimated for the primary serving cell 533, as described below. When extendedPHR is configured, the Type 1 and Type 2 power headroom may be estimated for each activated serving cell 533 with configured uplink, as described below.

A power headroom reporting delay is defined as the time between the beginning of the power headroom reference period and the time when the UE 102 starts transmitting the power headroom over the radio interface. The reporting delay of the power headroom may be 0 ms, which is applicable for all configured triggering mechanisms for power headroom reporting.

The power headroom reporting range is from −23 through +40 decibels (dB). Table (1) (from 3GPP TS 36.133, Table 9.1.8.4-1) defines the report mapping.

TABLE (1)

| Reported value | Measured quantity value (dB) |
|---|---|
| POWER_HEADROOM_0 | −23 ≤ PH < −22 |
| POWER_HEADROOM_1 | −22 ≤ PH < −21 |
| POWER_HEADROOM_2 | −21 ≤ PH < −20 |
| POWER_HEADROOM_3 | −20 ≤ PH < −19 |
| POWER_HEADROOM_4 | −19 ≤ PH < −18 |
| POWER_HEADROOM_5 | −18 ≤ PH < −17 |
| ... | ... |
| POWER_HEADROOM_57 | 34 ≤ PH < 35 |
| POWER_HEADROOM_58 | 35 ≤ PH < 36 |
| POWER_HEADROOM_59 | 36 ≤ PH < 37 |
| POWER_HEADROOM_60 | 37 ≤ PH < 38 |
| POWER_HEADROOM_61 | 38 ≤ PH < 39 |
| POWER_HEADROOM_62 | 39 ≤ PH < 40 |
| POWER_HEADROOM_63 | PH ≥ 40 |

The UE 102 may set its configured maximum output power ($P_{CMAX}$). $P_{CMAX}$ may be set within the bounds according to Equation (1).

$$P_{CMAX\_L} \leq P_{CMAX} \leq P_{CMAX\_H} \quad (1)$$

In Equation (1), $P_{CMAX\_L}$=MIN $\{P_{EMAX}-\Delta T_C$, $P_{PowerClass}$−MAX(MPR+A-MPR+$\Delta T_{IB,c}$, P-MPR)−$\Delta T_C\}$, $P_{CMAX\_H}$=MIN$\{P_{EMAX}, P_{PowerClass}\}$, and $P_{EMAX}$ is the value given to an information element (IE) P-Max. $P_{PowerClass}$ is the maximum UE 102 power (as specified in 3GPP TS 36.101, Table 6.2.2-1 without taking into account the tolerance specified in the Table 6.2.2-1). MPR is the allowed maximum power reduction (MPR) for the maximum output power due to higher order modulation and transmit bandwidth configuration (e.g., resource blocks). To meet additional adjacent channel leakage ratio (ACLR) and spectrum emission requirements, additional maximum power reduction (A-MPR) is allowed for the output power. $\Delta T_{IB,c}$ is the additional tolerance for serving cell c (as specified in 3GPP TS 36.101, Table 6.2.5A-3). Power management maximum power reduction (P-MPR) is the allowed maximum output power reduction for (a) ensuring compliance with applicable electromagnetic energy absorption requirements and addressing unwanted emissions or self defense requirements in case of simultaneous transmissions on multiple radio access technologies (RAT(s)) for scenarios not in scope of 3GPP RAN specifications, or (b) ensuring compliance with applicable electromagnetic energy absorption requirements in case of proximity detection is used to address such requirements that require a lower maximum output power.

For carrier aggregation the UE 102 may set its configured maximum output power $P_{CMAX,c}$ on serving cell c and its total configured maximum output power $P_{CMAX}$. $MPR_c$ and $A\text{-}MPR_c$ apply per serving cell c. P-MPRc may account for power management for serving cell c. The configured maximum output power on serving cell c may be set within bounds according to Equation (2).

$$P_{CMAX\_L,c} \leq P_{CMAX,c} \leq P_{CMAX\_H,c} \quad (2)$$

For carrier aggregation with two UL serving cells 533, the total configured maximum output power $P_{CMAX}$ may be set within bounds according to Equation (3):

$$P_{CMAX\_L,CA} \leq P_{CMAX,CA} \leq P_{CMAX\_H,CA} \quad (3)$$

Two types of UE 102 power headroom reports (PHR) are defined. A UE power headroom (PH) is valid for subframe i for serving cell c. A first type of PHR is referred to as a Type 1 report. If the UE 102 transmits PUSCH without PUCCH in subframe i for serving cell c, the power headroom for a Type 1 report is computed according to Equation (4).

$$PH_{type1,c}(i) = \quad (4)$$
$$P_{CMAX,c}(i) - \{10\log_{10}(M_{PUSCH,c}(i)) + P_{O\_PUSCH,c}(j) + \alpha_c(j) \cdot PL_c +$$
$$\Delta_{TF,c}(i) + f_c(i)\}[dB]$$

In Equation (4), $P_{CMAX,c}$ represents the maximum output power on serving cell c configured by the UE 102. $P_{CMAX}$ represents the maximum transmission power configured by the UE 102. The $M_{PUSCH(i)}$ value refers to the number of physical resource blocks (PRBs) of the UE's PUSCH transmitted in a subframe i. The $P_{O\_PUSCH(j)}$ value is determined by an uplink power control parameter and the type of the transmitted signal. The $\alpha(j)$ value represents a partial pathloss compensation factor. PL refers to an estimated pathloss by the UE 102. The $\Delta_{TF(i)}$ value is configured by a high-level parameter and is related to a transmission format of the UE 102. The f(i) value is determined by the transmit power control (TPC) command for a PUSCH received by the UE 102. If the UE 102 transmits PUSCH with PUCCH in subframe i for serving cell c, the power headroom for a Type 1 report is computed according to Equation (5).

$$PH_{type1,c}(i) = \quad (5)$$
$$\tilde{P}_{CMAX,c}(i) - \{10\log_{10}(M_{PUSCH,c}(i)) + P_{O\_PUSCH,c}(j) + \alpha_c(j) \cdot PL_c +$$
$$\Delta_{TF,c}(i) + f_c(i)\}[dB]$$

In Equation (5), $\tilde{P}_{CMAX,c}(i)$ may be computed assuming a PUSCH-only transmission in subframe i. For this case, the physical layer may deliver $\tilde{P}_{CMAX,c}(i)$ instead of $P_{CMAX,c}(i)$ to higher layers.

If the UE 102 does not transmit PUSCH in subframe i for serving cell c, the power headroom for a Type 1 report may be computed according to Equation (6). In Equation (6), $\tilde{P}_{CMAX,c}(i)$ may be computed assuming MPR=0 dB, A-MPR=0 dB, P-MPR=0 dB and $\Delta T_C$=0 dB.

$$PH_{type1,c}(i) = \tilde{P}_{CMAX,c}(i) - \{P_{O\_PUSCH,c}(1) + \alpha_c(1) \cdot PL_c + f_c(i)\}[dB] \quad (6)$$

A second type of PHR is referred to as a Type 2 report. If the UE 102 transmits PUSCH simultaneous with PUCCH in subframe i for the primary cell, power headroom for a Type 2 report may be computed according to Equation (7).

$$PH_{type2}(i) = P_{CMAX,c}(i) - 10\log_{10} \quad (7)$$
$$\left( 10^{(10\log_{10}(M_{PUSCH,c}(i)) + P_{O\_PUSCH,c}(j) + \alpha_c(j) \cdot PL_c + \Delta_{TF,c}(i) + f_c(i))/10} + \right.$$
$$\left. 10^{(P_{O\_PUCCH} + PL_c + h(n_{CQI}, n_{HARQ}, n_{SR}) + \Delta_{F\_PUCCH}(F) + \Delta_{TxD}(F') + g(i))/10} \right)$$
$$[dB]$$

In Equation (7), $P_{CMAX,c}$, $M_{PUSCH,c}(i)$, $P_{O\_PUSCH,c}(j)$, $\alpha_c(j)$, $\Delta_{TF,c}(i)$ and $f_c(i)$ are the primary cell parameters as described above. $P_{O\_PUCCH}$, $PL_c$, $h(n_{CQI}, n_{HARQ}, n_{SR})$, $\Delta_{F\_PUCCH}(F)$, $\Delta_{TxD}(F')$ and $g(i)$ are defined according to 3GPP TS 36.213, section 5.1.2.1. For example, $h(n_{CQI}, n_{HARQ}, n_{SR})$ is a PUCCH format dependent value. The $\Delta_{F\_PUCCH}(F)$ value is provided by higher layer and corresponds to a PUCCH format (F) relative to PUCCH format 1a. The $\Delta_{TxD}(F')$ value is configured for a UE 102 to transmit PUCCH on two antenna ports. The values $\Delta_{F\_PUCCH}(F)$, $\Delta_{TxD}(F')$ and $g(i)$ are determined by the TPC command for a PUCCH received by the UE 102.

If the UE 102 transmits PUSCH without PUCCH in subframe i for the primary cell, the power headroom for a Type 2 report may be computed according to Equation (8).

$$PH_{type2}(i) = P_{CMAX,c}(i) - 10\log_{10} \qquad (8)$$
$$\left(10^{(10\log_{10}(M_{PUSCH,c}(i)) + P_{O\_PUSCH,c}(j) + \alpha_c(j) \cdot PL_c + \Delta_{TF,c}(i) + f_c(i))/10} + 10^{(P_{O\_PUCCH} + PL_c + g(i))/10}\right)[dB]$$

In Equation (8), $P_{CMAX,c}(i)$, $M_{PUSCH,c}(i)$, $P_{O\_PUSCH,c}(i)$, $\alpha_c(j)$, $\Delta_{TF,c}(i)$ and $f_c(i)$ are the primary cell parameters. $P_{O\_PUCCH}$, $PL_c$ and $g(i)$ are defined according to 3GPP TS 36.213, section 5.1.2.1.

If the UE 102 transmits PUCCH without PUSCH in subframe i for the primary cell, the power headroom for a Type 2 report may be computed according to Equation (9).

$$PH_{type2}(i) = P_{CMAX,c}(i) - 10\log_{10} \qquad (9)$$
$$\left(\begin{array}{l} 10^{(P_{O\_PUSCH,c}(1) + \alpha_c(1) \cdot PL_c + f_c(i))/10} + \\ 10^{(P_{O\_PUCCH} + PL_c + h(n_{CQI}, n_{HARQ}, n_{SR}) + \Delta_{F\_PUCCH}(F) + \Delta_{TxD}(F') + g(i))/10} \end{array}\right)$$
$$[dB]$$

In Equation (9), $P_{O\_PUSCH,c}(1)$, $\alpha_c(1)$ and $f_c(i)$ are the primary cell parameters. $P_{CMAX,c}(i)$, $P_{O\_PUCCH}$, $PL_c$, $h(n_{CQI}, n_{HARQ}, n_{SR})$, $\Delta_{F\_PUCCH}(F)$, $\Delta_{TxD}(F')$ and $g(i)$ are also defined according to 3GPP TS 36.213, section 5.1.2.1.

If the UE 102 does not transmit PUCCH or PUSCH in subframe i for the primary cell, the power headroom for a Type 2 report may be computed according to Equation (10).

$$PH_{type2}(i) = \tilde{P}_{CMAX,c}(i) - 10\log_{10}\left(10^{(P_{O\_PUSCH,c}(1) + \alpha_c(1) \cdot PL_c + f_c(i))/10} + 10^{(P_{O\_PUCCH} + PL_c + g(i))/10}\right)[dB] \qquad (10)$$

In Equation (10), $\tilde{P}_{CMAX,c}(i)$ may be computed assuming MPR=0 dB, A-MPR=0 dB, P-MPR=0 dB and $\Delta T_C$=0 dB. $P_{O\_PUSCH,c}(1)$, $\alpha_c(1)$ and $f_c(i)$ are the primary cell parameters. $P_{O\_PUCCH}$, $PL_c$ and $g(i)$ may be defined according to 3GPP TS 36.213, section 5.1.2.1.

The power headroom may be rounded to the closest value in the range [40; −23] dB with steps of 1 dB. Furthermore, the power headroom may be delivered by the physical layer to higher layers.

To summarize, the Type 1 power headroom report may be computed as $P_{CMAX,c}$ minus PUSCH power (e.g., $P_{CMAX,c}$−P_PUSCH). The Type 2 power headroom report may be computed as $P_{CMAX,c}$ minus PUCCH power minus PUSCH power (e.g., $P_{CMAX,c}$−P_PUCCH−P_PUSCH).

UL transmission is based on open loop power control to calculate adequate transmission power. The calculation is made on UE 102 side with pathloss, resource block size, modulation and coding scheme (MCS) level (e.g., channel quality indicators (CQI)) and noise and interference (NI) level. At each UL TTI, the UE 102 may calculate PH and may deliver the PH to an eNB 160, if necessary. Referring to scheduling information at the TTI and a power headroom report (PHR) received from UE 102, the eNB 160 may estimate an adequate UL grant at the next scheduling TTI in order to maximize per-user UL throughput. The eNB 160 may consider the quality of service (QoS) of radio bearer and fairness factor of a UE 102. The eNB 160 may also avoid scaling down on UL transmission due to the shortage of UE 102 power.

However, in a multi-connectivity scenario (e.g., dual connectivity), a UE 102 may have a first radio connection 635*a* to one eNB 160 and a second radio connection 635*b* to a different eNB 160. In this case, an eNB 160 may not have knowledge of necessary information to estimate the adequate UL grant because the eNB 160 may not know the scheduling information of the other connection (e.g., the second radio connection 635*b*) scheduled by the other eNB 160. The eNB 160 may decide a UL grant (including resource allocation and MCS level) to maximize per-user throughput within the UE PH range reported by UE 102, which means the PH to consider the total UE transmission power. Correspondingly, the UE 102 would suffer from scaling down UL transmission due to UL grant overwhelming allowed maximum transmission power (e.g., negative PH) as shown in FIG. 6.

In the first radio connection 635*a*, there are two activated serving cells with configured uplink. In the second radio connection 635*b*, there are three activated serving cells with configured uplink. $P_{CMAX,c}$ may be adjusted with upper bound of $P_{EMAX,c}$ for each serving cell c. In each serving cell, a power headroom may be evaluated and detected. The total power of transmissions on each of the first radio connection 635*a* and the second radio connection 635*b* may be adjusted as not to exceed $P_{CMAX}$ and $P_{PowerClass}$. Each eNB 160 can take into account those boundaries in scheduling and uplink power control based on PHRs in each radio connection 635. However, each eNB 160 does not have enough information to avoid overwhelming allowed maximum transmission power in total of transmissions in two radio connection.

Figure 7:
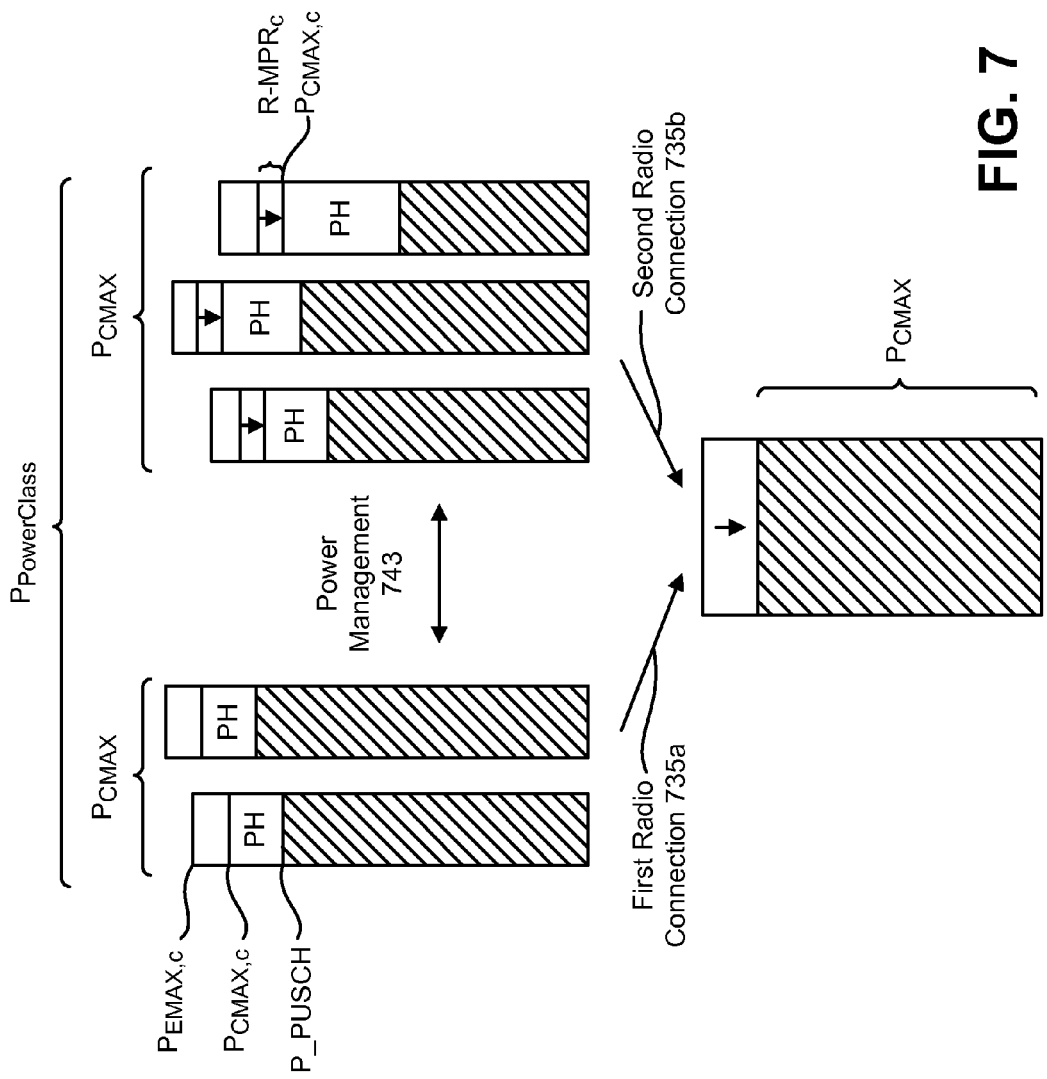
FIG. 7 is a block diagram illustrating a configuration of power headroom reporting for multi-connectivity operation.

FIG. 7 is a block diagram illustrating a configuration of power headroom reporting for multi-connectivity operation. In a small cell deployment scenario, each eNB 160 (e.g., node) may have its own independent scheduler. To utilize radio resources of each eNB 160, the UE 102 may connect to each eNB 160, which have different schedulers. For example, in order for the UE 102 to connect to both eNBs 160, multi-connectivity between the UE 102 and E-UTRAN 415 may be utilized. In addition to Release-11 operation, a UE 102 operating according to Release-12 may be configured with multi-connectivity. As described in connection with FIG. 4, the UE 102 may connect to the E-UTRAN 415 with multiple Uu 421, 423 interfaces, if configured. In another configuration, the UE 102 may be configured to establish additional radio interfaces (radio connections 535) by using one radio interface (radio connection 535).

In a multi-connectivity scenario, backhaul between eNBs 160 is assumed to be non-ideal. Therefore, MAC information of each eNB 160 cannot be exchanged fast enough to control scheduling. Also, uplink power control and uplink radio resource allocation are controlled by PHY layer of each eNB 160. Therefore, an eNB 160 may not know the uplink power situation of the UE 102 in a timely manner. However, power headroom reporting assumes that an eNB 160 knows uplink radio resource allocation of each serving cell 533 for the UE 102.

To overcome this issue, a 3GPP RAN-maximum power reduction (R-MPRc) parameter may be utilized to provide for efficient power headroom reporting. As used herein, the R-MPRc is the required power backoff for each activated serving cell 533 corresponding to a MAC operation's (second) radio connection 735b due to power management 743 caused by transmission(s) on the other radio connection(s) (e.g., the first radio connection 735a). By reducing $P_{CMAX,c}$ by applying R-MPRc, a more conservative PHR may be achieved and scaling down due to overwhelming allowed by maximum transmission power may be avoided.

It should be noted that R-MPRc is applied independently of power backoff due to power management as allowed by P-MPRc. For example, P-MPRc is applied in the case of simultaneous transmissions on multiple RAT(s) for scenarios not in the scope of 3GPP RAN specifications or in the case of proximity detection. However, R-MPRc is applied in the case of simultaneous transmission on multiple radio connections 735, where a first radio connection 735a and a second radio connection 735b are connections between E-UTRAN 415 and a UE 102.

Currently, $P_{CMAX\_L,c}$ is defined as $P_{CMAX\_L,c} = \text{MIN}\{P_{EMAX,c} - \Delta T_{C,c}, P_{PowerClass} - \text{MAX}(MPR_c + A\text{-}MPR_c + \Delta T_{IB,c}, P\text{-}MPR_c) - \Delta T_{C,c}\}$. By introducing R-MPRc, $P_{CMAX\_L,c}$ may be defined as $P_{CMAX\_L,c} = \text{MIN}\{P_{PEMAX,c} - \Delta T_{C,c}, P_{PowerClass} - \text{MAX}(MPR_c + A\text{-}MPR_c + R\text{-}MPR_c + \Delta T_{IB,c}, P\text{-}MPR_c) - \Delta T_{C,c}\}$. In another example, $P_{CMAX\_L,c}$ may be defined as $P_{CMAX\_L,c} = \text{MIN}\{P_{EMAX,c} - \Delta T_{C,c}, P_{PowerClass} - \text{MAX}(MPR_c + A\text{-}MPR_c + \Delta T_{IB,c}, P\text{-}MPR_c, R\text{-}MPR_c) - \Delta T_{C,c}\}$.

In the first radio connection 735a, there are two activated serving cells with configured uplink. In the second radio connection 735b, there are three activated serving cells with configured uplink. $P_{CMAX,c}$ may be adjusted with upper bound of $P_{EMAX,c}$ for each serving cell c. In each serving cell, a power headroom may be evaluated and detected. The total power of transmissions on each of the first radio connection 735a and the second radio connection 735b may be adjusted as not to exceed $P_{CMAX}$ and $P_{PowerClass}$. Each eNB 160 can take into account those boundaries in scheduling and uplink power control based on PHRs in each radio connection 735.

In the configuration illustrated in FIG. 7, each eNB 160 may obtain information related to the power management 743 corresponding to a first radio connection 735a from the extended power headroom MAC control element. For example, an eNB 160 may obtain one or more R-MPRc values or an indication of power backoff for an activated serving cell corresponding to the second radio connection caused by a transmission on the first radio connection. Therefore, the eNB 160 may obtain information to avoid overwhelming allowed maximum transmission power in total of transmissions in two radio connection.

One MAC operation may be applied to the first radio connection 735a or the second radio connection 735b. The UE 102 may be allowed to set its configured maximum output power R-MPRc on serving cell c. In one configuration, the R-MPRc may be applied only to the first radio connection 735a. In another configuration, the R-MPRc may be applied only to the second radio connection 735b. In yet another configuration, the R-MPRc may be applied to both the first radio connection 735a and the second radio connection 735b. The radio connection 735 to which the R-MPRc is allowed to be applied may be configured to the UE 102 by the eNB 160.

In one configuration, for each radio connection 735, a PHR may be triggered if certain events occur. A PHR report may be triggered if a prohibitPHR-Timer expires or has expired and the path loss has changed more than dl-PathlossChange dB for at least one activated serving cell 533 which is used as a pathloss reference since the last transmission of a PHR when the UE 102 has UL resources for new transmission. A PHR report may be triggered if a periodicPHR-Timer expires. A PHR report may be triggered upon configuration or reconfiguration of the power headroom reporting functionality by upper layers, which is not used to disable the function. A PHR report may be triggered upon activation of an SCell with configured uplink.

A PHR report may also be triggered if prohibitPHR-Timer expires or has expired, when the UE 102 has UL resources for new transmission, and the following is true in this TTI for any of the activated serving cells 533 with configured uplink. If there are UL resources allocated for transmission or there is a PUCCH transmission on this cell, and the required power backoff due to power management (as allowed by P-MPRc) for this cell has changed more than dl-PathlossChange dB since the last transmission of a PHR when the UE 102 had UL resources allocated for transmission or PUCCH transmission on this cell.

A PHR report may also be triggered if prohibitPHR-Timer expires or has expired, when the UE 102 has UL resources for new transmission, and the following is true in this TTI for any of the activated serving cells 533 with configured uplink. If there are UL resources allocated for transmission or there is a PUCCH transmission on this cell, and the required power backoff due to power management (as allowed by R-MPRc) for this cell has changed more than dl-PathlossChange dB since the last transmission of a PHR when the UE 102 had UL resources allocated for transmission or PUCCH transmission on this cell.

Figure 8:
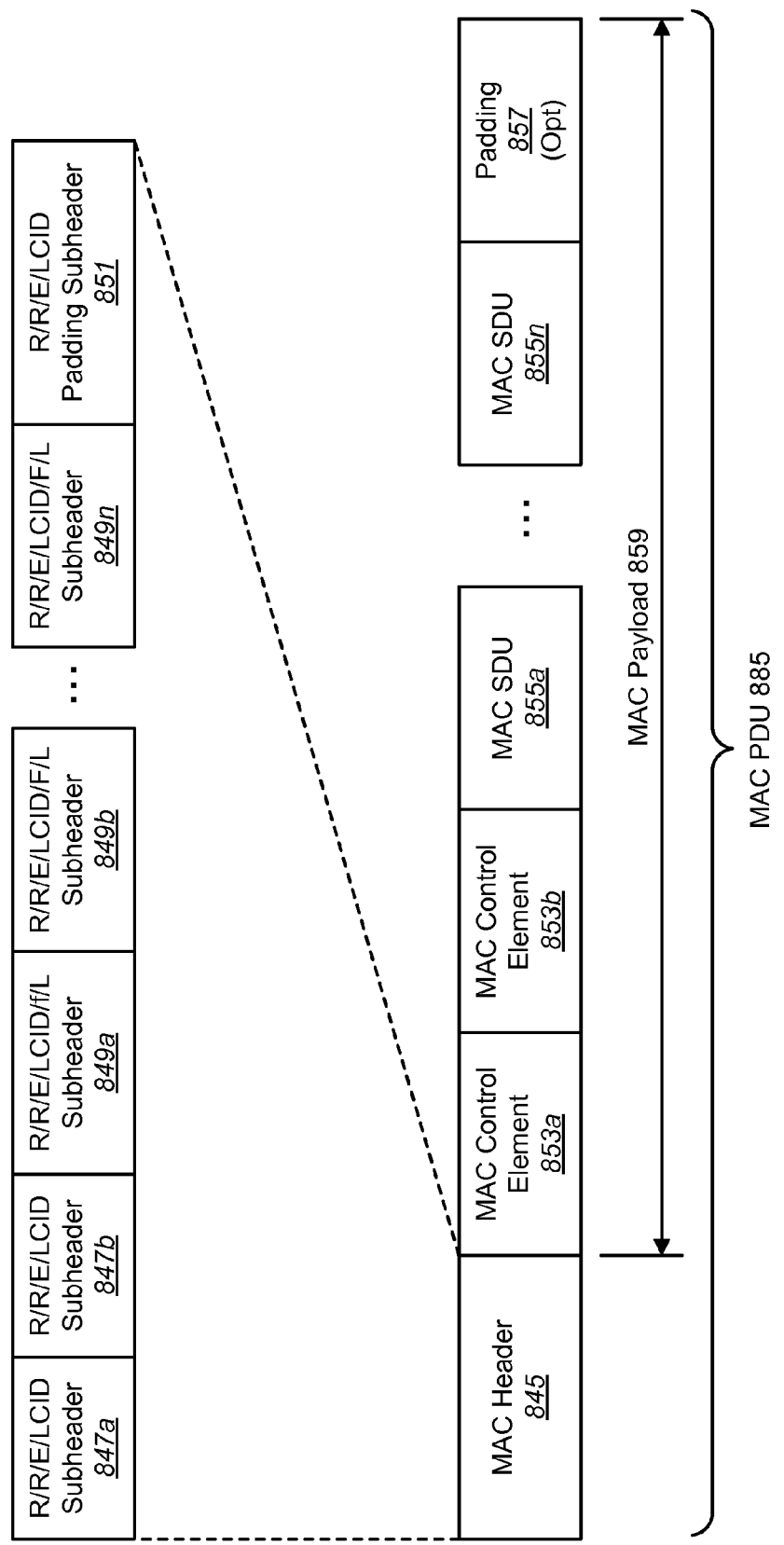
FIG. 8 is a block diagram illustrating one configuration of a MAC protocol data unit (PDU)

FIG. 8 is a block diagram illustrating one configuration of a MAC protocol data unit (PDU) 885. A MAC PDU 885 is a bit string that is byte aligned (e.g., a multiple of 8 bits) in length. A MAC PDU 885 may include a MAC header 845, zero or more MAC service data units (MAC SDU) 855a-n, zero, or more MAC control elements 853a-b, and optionally padding 857. Both the MAC header 845 and the MAC SDUs are of variable sizes. A MAC payload 859 may include zero or more MAC service data units (MAC SDU) 855a-n, zero, or more MAC control elements 853a-b, and optional padding 857.

The MAC header 845 illustrated in FIG. 8 includes R/R/E/LCID subheaders 847a-b, R/R/E/LCID/F/L subheaders 849a-n and an R/R/E/LCID/F/L padding subheader 851. A MAC header 845 may include one or more MAC PDU 885 subheaders. Each subheader may correspond to either a MAC SDU 855, a MAC control element 853 or padding 857. A MAC PDU subheader may include six header fields R/R/E/LCID/F/L, except for the last subheader in the MAC PDU 885 and for fixed sized MAC control elements 853. The last subheader in the MAC PDU 885 and subheaders for fixed sized MAC control elements 853 may include the four header fields R/R/E/LCID 847. A MAC PDU subheader corresponding to padding (e.g., R/R/E/LCID padding subheader 851) may include the four header fields R/R/E/LCID.

MAC PDU subheaders may have the same order as the corresponding MAC SDUs 855, MAC control elements 853 and padding 857. MAC control elements 853 may be placed before any MAC SDU 855. Padding 857 may occur at the end of the MAC PDU 885, except when single-byte or two-byte padding 857 is required. Padding 857 may have any value and the UE 102 may ignore it. When padding 857 is performed at the end of the MAC PDU 885, zero or more padding bytes are allowed. When single-byte or two-byte padding 857 is required, one or two MAC PDU subheaders corresponding to padding 857 are placed at the beginning of the MAC PDU 885 before any other MAC PDU subheader.

A maximum of one MAC PDU 885 can be transmitted per transport block (TB) per UE 102. A maximum of one multicast channel (MCH) MAC PDU 885 can be transmitted per TTI.

The MAC PDU illustrated in FIG. 8 is a bit string that may be represented by tables in which the most significant bit is the leftmost bit of the first line of the table, the least significant bit is the rightmost bit on the last line of the table, and more generally the bit string is to be read from left to right and then in the reading order of the lines. The bit order of each parameter field within a MAC PDU 885 may be represented with the first and most significant bit in the leftmost bit and the last and least significant bit in the rightmost bit. MAC SDUs 855 are bit strings that are byte aligned (i.e. multiple of 8 bits) in length. A MAC SDU 855 may be included into a MAC PDU 885 from the first bit onward. The UE 102 may ignore the value of reserved bits in downlink MAC PDUs 885.

Figure 9:
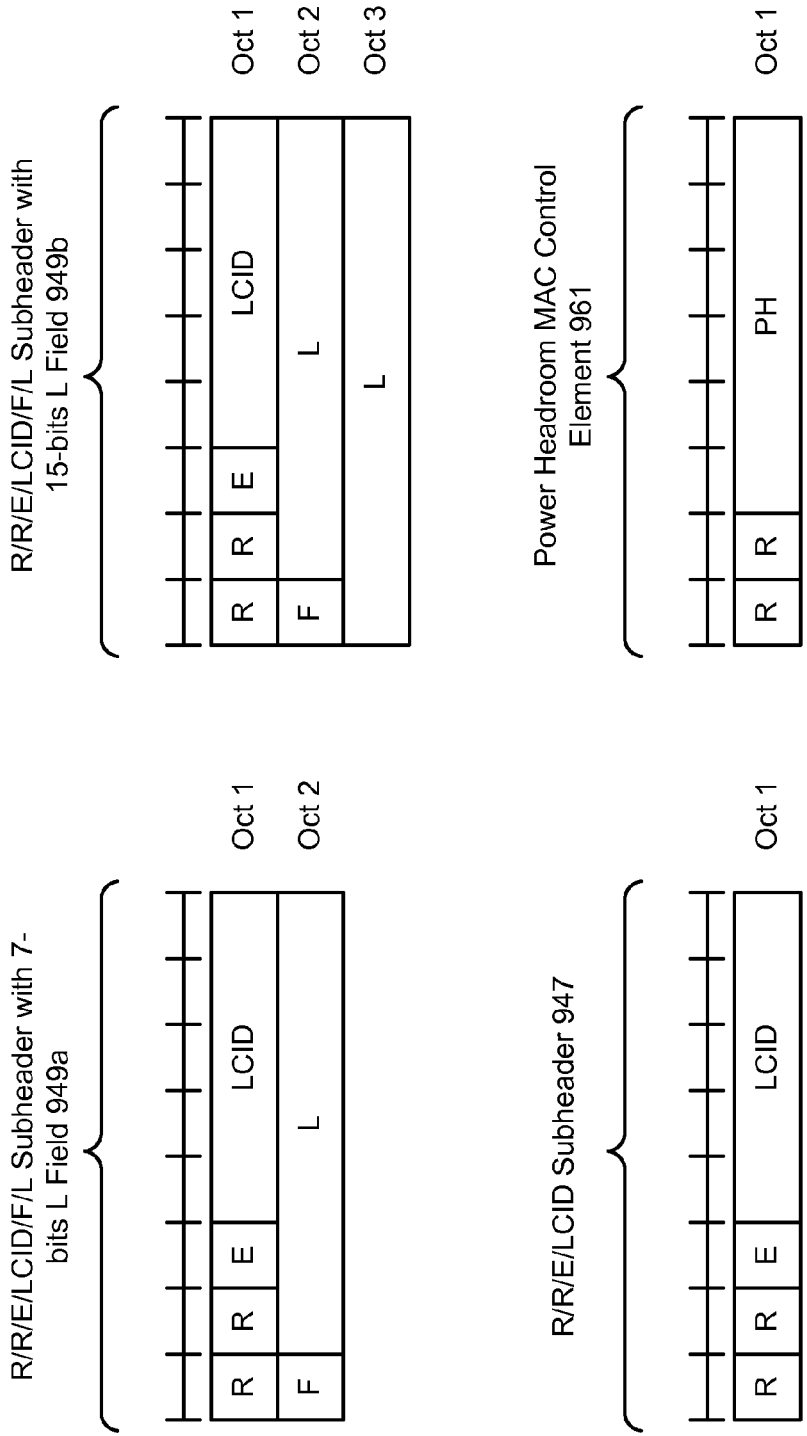
FIG. 9 is a block diagram illustrating various configurations of MAC PDU subheaders and a power headroom MAC control element.

FIG. 9 is a block diagram illustrating various configurations of MAC PDU subheaders 947, 949 and a power headroom MAC control element 961. A MAC PDU 855 is a bit string that may be byte aligned (e.g., multiple of 8 bits) in length. The MAC header 845 and subheaders may be octet aligned.

The MAC header 845 is of variable size and may include the logical channel ID (LCID) fields, length (L) fields, format (F) fields, extension (E) fields and reserved (R) fields. The LCID field may identify the logical channel instance of the corresponding MAC SDU 855 or the type of the corresponding MAC control element 853 or padding 857 as described in Table (2) (from 3GPP TS 36.321, Table 6.2.1-1), Table (3) (from 3GPP TS 36.321, Table 6.2.1-2) and Table (4) (from 3GPP TS 36.321, Table 6.2.1-4) for the downlink-shared channel (DL-SCH), uplink shared channel (UL-SCH) and multicast channel (MCH) respectively. There may be one LCID field for each MAC SDU 855, MAC control element 853 or padding 857 included in the MAC PDU 885. One or two additional LCID fields may be included in the MAC PDU 885, when single-byte or two-byte padding 857 is required but cannot be achieved by padding 857 at the end of the MAC PDU 885. The LCID field size may be 5 bits.

TABLE (2)

| Index | LCID values |
| --- | --- |
| 00000 | CCCH |
| 00001-01010 | Identity of the logical channel |
| 01011-11010 | Reserved |
| 11011 | Activation/Deactivation |
| 11100 | UE Contention Resolution Identity |
| 11101 | Timing Advance Command |
| 11110 | DRX Command |
| 11111 | Padding |

TABLE (3)

| Index | LCID values |
| --- | --- |
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

TABLE (4)

| Index | LCID values |
| --- | --- |
| 00000 | MCCH (see note) |
| 00001-11100 | MTCH |
| 11101 | Reserved |
| 11110 | MCH Scheduling Information |
| 11111 | Padding |

NOTE:
If there is no multicast control channel (MCCH) on MCH, a multicast traffic channel (MTCH) could use this value.

The length (L) field may indicate the length of the corresponding MAC SDU 855 or variable-sized MAC control element 853 in bytes. There may be one L field per MAC PDU subheader except for the last subheader and subheaders corresponding to fixed-sized MAC control elements. The size of the L field may be indicated by the F field.

The format (F) field may indicate the size of the length field as indicated in Table (5) (from 3GPP TS 36.321, Table 6.2.1-3). There may be one F field per MAC PDU subheader except for the last subheader and subheaders corresponding to fixed-sized MAC control elements 853. The size of the F field is 1 bit. If the size of the MAC SDU 855 or variable-sized MAC control element 853 is less than 128 bytes, the value of the F field may be set to 0, otherwise the value of the F field may be set to 1.

TABLE (5)

| Index | Size of Length field (in bits) |
| --- | --- |
| 0 | 7 |
| 1 | 15 |

The extension (E) field may be a flag indicating if more fields are present in the MAC header 845 or not. The E field may be set to "1" to indicate another set of at least R/R/E/LCID fields. The E field may be set to "0" to indicate that either a MAC SDU 855, a MAC control element 853 or padding 857 starts at the next byte.

The MAC header 845 may also include a reserved (R) bit. In some implementations, the reserved bit may be set to "0".

An R/R/E/LCID/F/L subheader with 7-bits L field 949a may be included in two octets. The first octet may include two R bits, and E field and an LCID field. The second octet may include an F field and a 7-bit L field.

An R/R/E/LCID/F/L subheader with 15-bits L field 949b may be included in three octets. The first octet may include two R bits, and E field and an LCID field. The second octet may include an F field and a 7-bit L field. The third octet may include an 8-bit L field.

An R/R/E/LCID subheader 947 may be included in one octet. The first octet may include two R bits, and E field and an LCID field.

The power headroom MAC control element 961 may be identified by a MAC PDU subheader with LCID as specified in Table (3). The power headroom MAC control element 961 may have a fixed size and may consist of a single octet. The power headroom MAC control element 961 may include an R bit, set to "0". A PH field may indicate the power headroom level. The length of the PH field may be 6 bits. The reported PH and the corresponding power headroom levels are shown in Table (6) (from 3GPP TS 36.321, Table 6.1.3.6-1). The corresponding measured values in dB can be found based on Table (1) above.

TABLE (6)

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

Figure 10:
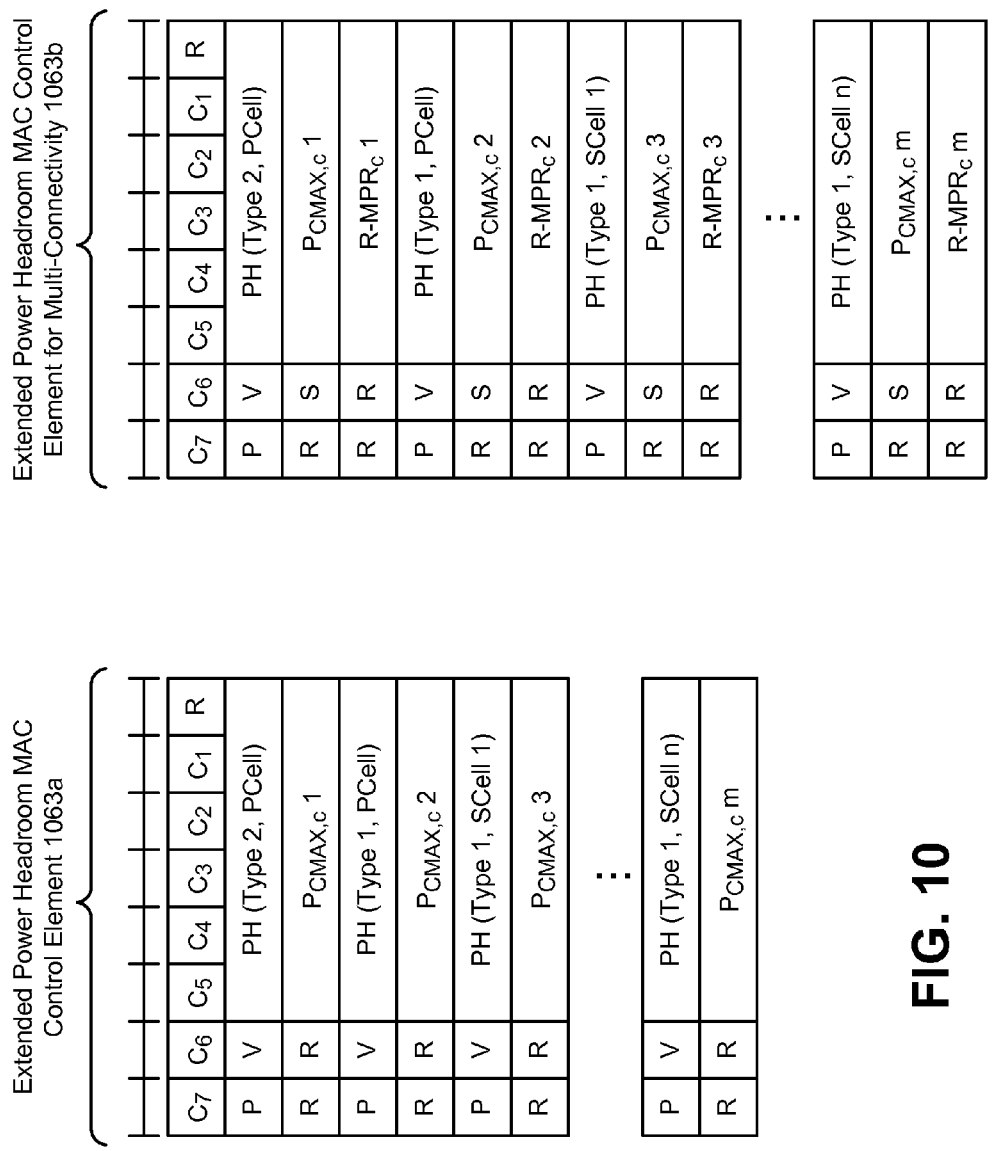
FIG. 10 illustrates examples of an extended power headroom MAC control element and an extended power headroom MAC control element for multi-connectivity.

FIG. 10 illustrates examples of an extended power headroom MAC control element 1063a and an extended power headroom MAC control element for multi-connectivity 1063b. An extended power headroom MAC control element 1063 may be identified by a MAC PDU subheader with LCID as specified in Table (3) above. An extended power headroom MAC control element 1063 may have a variable size and may be used in a power headroom report procedure. An extended power headroom MAC control element may also be referred to as an extended PHR MAC control element.

For the extended power headroom MAC control element 1063a, when Type 2 PH is reported, the octet containing the Type 2 PH field may be included first after the octet indicating the presence of PH per SCell and followed by an octet containing the associated $P_{CMAX,c}$ field (if reported). Then follows in ascending order based on the ServCellIndex an octet with the Type 1 PH field and an octet with the associated $P_{CMAX,c}$ field (if reported), for the PCell and for each SCell indicated in the bitmap.

The extended power headroom MAC control element 1063a may be defined as follows. A Ci field may indicate the presence of a PH field for the SCell with SCellIndex i. The Ci field set to "1" may indicate that a PH field for the SCell with SCellIndex i is reported. The Ci field set to "0" may indicate that a PH field for the SCell with SCellIndex i is not reported. A reserved bit (R) may be set to "0".

The V field may indicate if the PH value is based on a real transmission or a reference format. For a Type 1 PH, V=0 may indicate a real transmission on PUSCH and V=1 may indicate that a PUSCH reference format is used. For a Type 2 PH, V=0 may indicate a real transmission on PUCCH and V=1 may indicate that a PUCCH reference format is used. Furthermore, for both Type 1 and Type 2 PH, V=0 may indicate the presence of the octet containing the associated $P_{CMAX,c}$ field, and V=1 indicates that the octet containing the associated $P_{CMAX,c}$ field is omitted.

The power headroom (PH) field may indicate the power headroom level. The length of the field is 6 bits. The reported PH and the corresponding power headroom levels are shown in Table (6) above. The corresponding measured values in dB can be found based on Table (1) above.

The P field may indicate whether the UE 102 applies power backoff due to power management (as allowed by P-MPRc). The UE 102 may set P=1 if the corresponding $P_{CMAX,c}$ field would have had a different value if no power backoff due to power management had been applied.

The $P_{CMAX,c}$ field, if present, may indicate the $P_{CMAX,c}$ or $\tilde{P}_{CMAX,c}$ used for calculation of the preceding PH field. The reported $P_{CMAX,c}$ and the corresponding nominal UE 102 transmit power levels are shown in Table (7) (from 3GPP TS 36.321, Table 6.1.3.6a-1).

TABLE (7)

| $P_{CMAX,c}$ | Nominal UE transmit power level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

A configuration of an extended power headroom MAC control element for multi-connectivity 1063b is also illustrated in FIG. 10. In this configuration, the value of the required power backoff may be obtained. This may be accomplished as described above in connection with FIG. 7. For example, a UE 102 may obtain an R-MPRc for each activated serving cell 533. The R-MPRc is the required power backoff for each activated serving cell 533 corresponding to a MAC operation (e.g., second radio connection 535b) due to power management 743 caused by transmission(s) on the other radio connection(s) (e.g., the first radio connection 535a).

The extended power headroom MAC control element 1063b may include a P field for P-MPRc and an S field for R-MPRc. An S field indicates for a Type 2 PH for the PCell and/or for a Type 1 PH for the PCell and for each SCell indicated in the bitmap whether the UE 102 applies power backoff due to power management 743 caused by transmission(s) on the other radio connection(s) 535. S=1 indicates the presence of the octet containing the associated R-MPRc field following an octet containing the associated $P_{CMAX,c}$ field. S=0 indicates that the octet containing the associated R-MPRc field is omitted.

Figure 11:
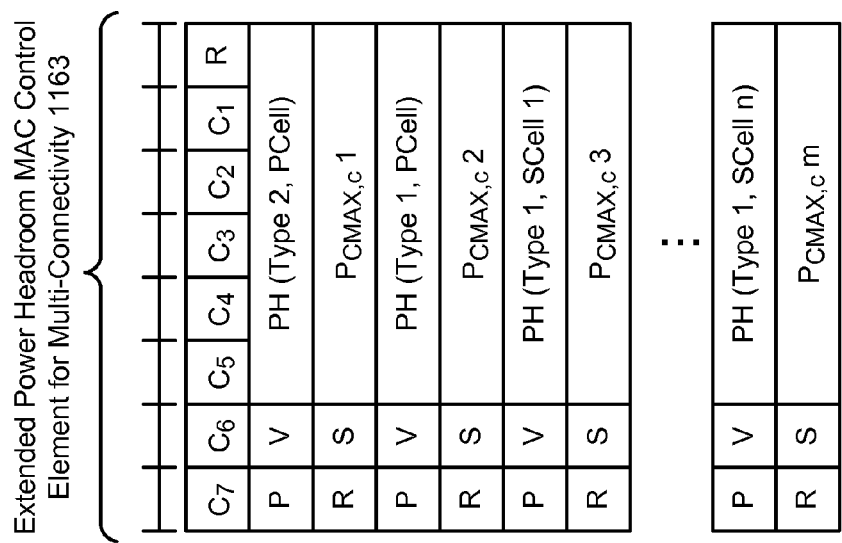
FIG. 11 illustrates another example of an extended power headroom MAC control element for multi-connectivity.

FIG. 11 illustrates another example of an extended power headroom MAC control element for multi-connectivity 1163. The extended power headroom MAC control element 1163 may be identified by a MAC PDU subheader with LCID as specified in Table (3) above. An extended power headroom MAC control element 1163 may have a variable size and may be used in a power headroom report procedure.

In the configuration illustrated in FIG. 11, the value of the required power backoff (e.g., R-MPRc) may not be included in the extended power headroom MAC control element 1163. In this configuration, the UE 102 may just indicate, for each activated serving cell 533, whether the UE 102 applies power backoff due to power management 743 caused by transmission(s) on the other radio connection(s) 535. For example, S=1 indicates that the UE 102 applies power backoff due to power management 743 caused by transmission(s) on the other radio connection(s) 535 for an activated serving cell 533. S=0 indicates that the UE 102 does not apply power backoff due to power management 743 caused by transmission(s) on the other radio connection(s) 535 for an activated serving cell 533. Therefore, the S field may indicate whether R-MPRc has been applied, but the actual value(s) of R-MPRc may not be included in the extended power headroom MAC control element 1163.

Figure 12:
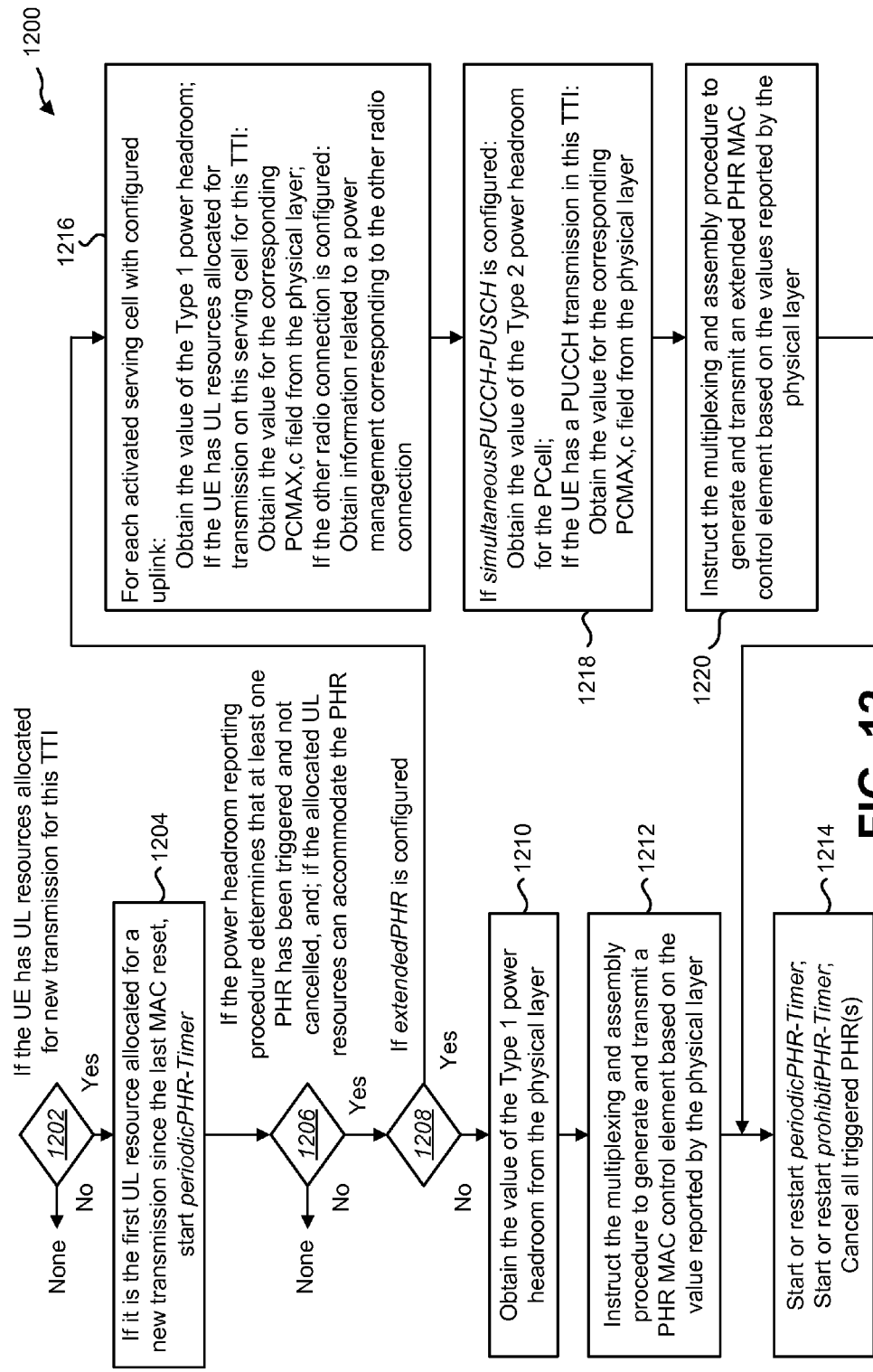
FIG. 12 is a flow diagram illustrating a method for multi-connectivity operation.

FIG. 12 is a flow diagram illustrating a method 1200 for multi-connectivity operation. The method 1200 may be performed by a UE 102. The method 1200 may be applied to each radio connection 535. The UE 102 may establish a first radio connection 535*a* to an eNB 160 and a second radio connection 535*b* to another eNB 160. Each radio connection 535 may be associated with one or more activated serving cells 533. The UE 102 may determine 1202 if the UE 102 has UL resources allocated for a new transmission for this TTI. If the UE 102 does not have UL resources allocated for new transmission for this TTI, then the method 1200 ends.

If the UE 102 has UL resources allocated for new transmission for this TTI, then the method 1200 continues to step 1204. If the UE 102 determines that the UL resource(s) allocated for new transmission is the first UL resource allocated for a new transmission since the last MAC reset, the UE 102 may start periodicPHR-Timer.

In step 1206, the power headroom reporting procedure may determines that at least one PHR has been triggered and not cancelled. The power headroom reporting procedure may also determine if the allocated UL resources can accommodate a PHR MAC control element 961 plus its subheader if extendedPHR is not configured, or the extended PHR MAC control element 1063 plus its subheader if extendedPHR is configured, as a result of logical channel prioritization. If the result of step 1206 is false (e.g., no), the method 1200 ends. If the result of step 1206 is true (e.g., yes), the UE 102 may determine 1208 if extendedPHR is configured.

If extendedPHR is not configured, the UE 102 may obtain 1210 the value of the Type 1 power headroom from the physical layer. The UE 102 may instruct 1212 the Multiplexing and Assembly procedure to generate and transmit a PHR MAC control element 961 based on the value reported by the physical layer. The UE 102 may then perform step 1214. For example, the UE 102 may start or restart periodicPHR-Timer. The UE 102 may start or restart prohibitPHR-Timer. The UE 102 may cancel all triggered PHR(s).

If extendedPHR is configured (e.g., step 1208 is true), the UE 102 may perform step 1216. For each activated serving cell 533 with configured uplink, the UE 102 may obtain the value of the Type 1 power headroom. If the UE 102 has UL resources allocated for transmission on a serving cell for this TTI, the UE 102 may obtain the value for the corresponding $P_{CMAX,c}$ field from the physical layer. If the other radio connection 535 is configured, the UE 102 may obtain information related to a power management 743 corresponding to the other radio connection 535 (e.g., for an extended power headroom MAC control element for a second radio connection 535*b*, indications whether each power backoff for each activated serving cell corresponding to the second radio connection caused by a transmission on the first radio connection.). As used herein, the other radio connection may mean the radio connection 535 that is different than the radio connection 535 concerning to the power headroom report procedure (e.g., concerning the MAC operation or MAC entity) assuming that a power headroom report procedure is applied to each radio connection 535.

The UE 102 may perform step 1218. If simultaneous-PUCCH-PUSCH is configured, the UE 102 may obtain the value of the Type 2 power headroom for the PCell. If the UE 102 has a PUCCH transmission in this TTI, the UE 102 may obtain the value for the corresponding $C_{CMAX,c}$ field from the physical layer.

The UE 102 may instruct 1220 the multiplexing and assembly procedure to generate and transmit an Extended PHR MAC control element 1063 based on the values reported by the physical layer.

The UE 102 may then perform step 1214. For example, the UE 102 may start or restart periodicPHR-Timer. The UE 102 may start or restart prohibitPHR-Timer. The UE 102 may cancel all triggered PHR(s).

Figure 13:
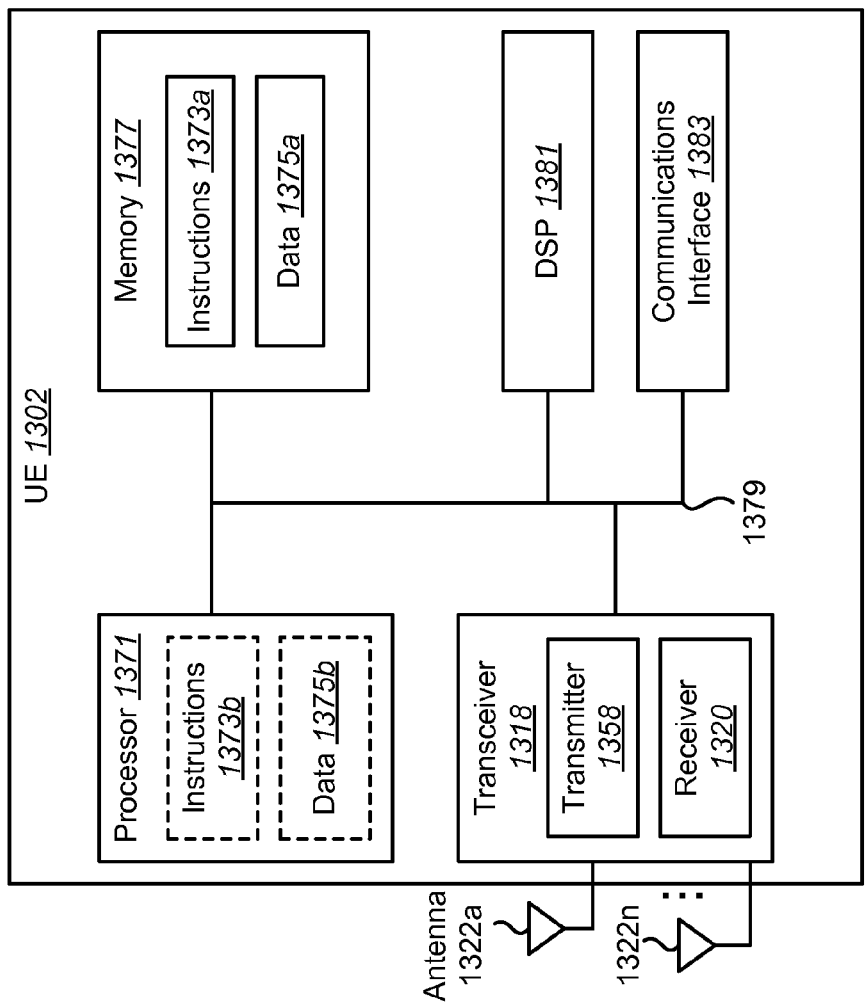
FIG. 13 illustrates various components that may be utilized in a UE.

FIG. 13 illustrates various components that may be utilized in a UE 1302. The UE 1302 described in connection with FIG. 13 may be implemented in accordance with the UE 102 described in connection with FIG. 1. The UE 1302 includes a processor 1371 that controls operation of the UE 1302. The processor 1371 may also be referred to as a central processing unit (CPU). Memory 1377, which may include read-only memory (ROM), random access memory (RAM), a combination of the two or any type of device that may store information, provides instructions 1373*a* and data 1375*a* to the processor 1371. A portion of the memory 1377 may also include non-volatile random access memory (NVRAM). Instructions 1373*b* and data 1375*b* may also reside in the processor 1371. Instructions 1373*b* and/or data 1375*b* loaded into the processor 1371 may also include instructions 1373*a* and/or data 1375*a* from memory 1377 that were loaded for execution or processing by the processor 1371. The instructions 1373*b* may be executed by the processor 1371 to implement one or more of the methods 200 described above.

The UE 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322*a-n* are attached to the housing and electrically coupled to the transceiver 1318.

The various components of the UE 1302 are coupled together by a bus system 1379, which may include a power bus, a control signal bus and a status signal bus, in addition to a data bus. However, for the sake of clarity, the various buses are illustrated in FIG. 13 as the bus system 1379. The UE 1302 may also include a digital signal processor (DSP) 1381 for use in processing signals. The UE 1302 may also include a communications interface 1383 that provides user access to the functions of the UE 1302. The UE 1302 illustrated in FIG. 13 is a functional block diagram rather than a listing of specific components.

Figure 14:
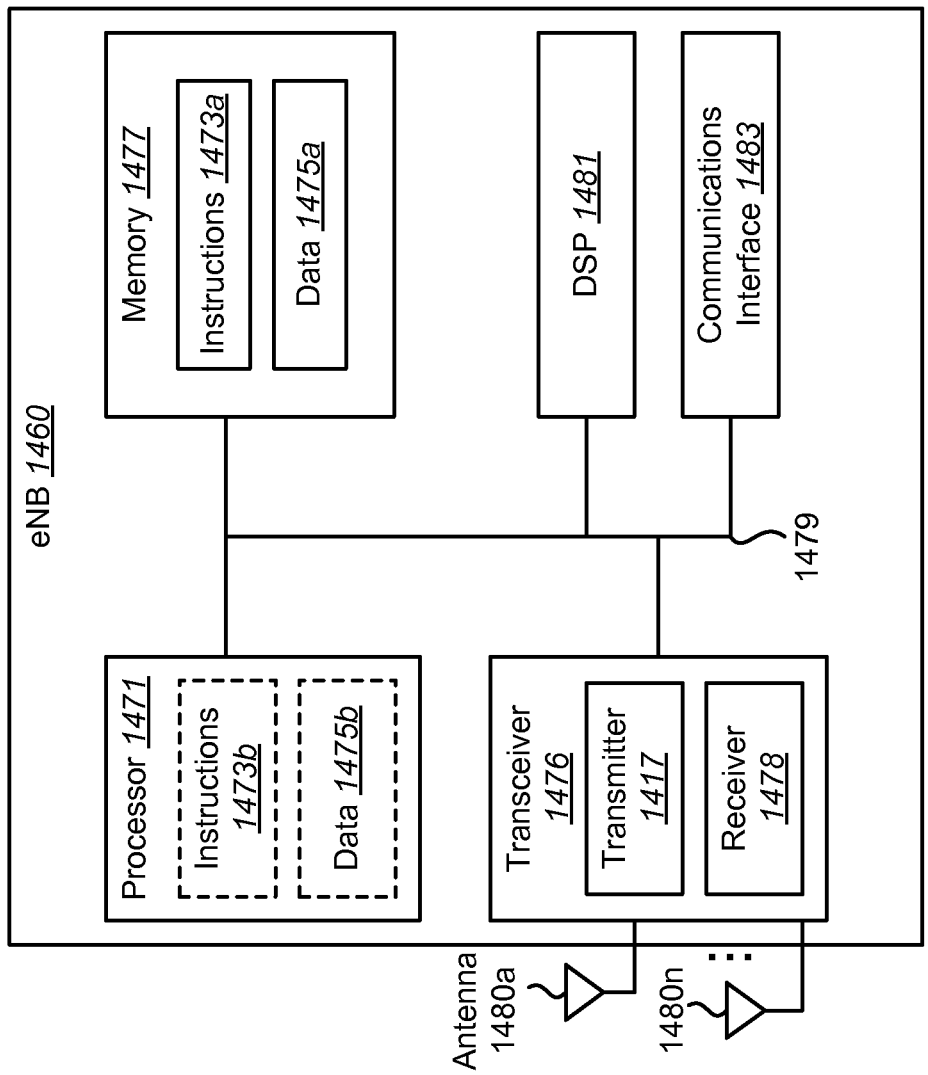
FIG. 14 illustrates various components that may be utilized in an eNB.

FIG. 14 illustrates various components that may be utilized in an eNB 1460. The eNB 1460 described in connection with FIG. 14 may be implemented in accordance with the eNB 160 described in connection with FIG. 1. The eNB 1460 includes a processor 1471 that controls operation of the eNB 1460. The processor 1471 may also be referred to as a central processing unit (CPU). Memory 1477, which may include read-only memory (ROM), random access memory (RAM), a combination of the two or any type of device that may store information, provides instructions 1473*a* and data 1475*a* to the processor 1471. A portion of the memory 1477 may also include non-volatile random access memory (NVRAM). Instructions 1473*b* and data 1475*b* may also reside in the processor 1471. Instructions 1473*b* and/or data 1475*b* loaded into the processor 1471 may also include instructions 1473*a* and/or data 1475*a* from memory 1477 that were loaded for execution or processing by the processor 1471. The instructions 1473*b* may be executed by the processor 1471 to implement one or more of the methods 300 described above.

The eNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480a-n are attached to the housing and electrically coupled to the transceiver 1476.

The various components of the eNB 1460 are coupled together by a bus system 1479, which may include a power bus, a control signal bus and a status signal bus, in addition to a data bus. However, for the sake of clarity, the various buses are illustrated in FIG. 14 as the bus system 1479. The eNB 1460 may also include a digital signal processor (DSP) 1481 for use in processing signals. The eNB 1460 may also include a communications interface 1483 that provides user access to the functions of the eNB 1460. The eNB 1460 illustrated in FIG. 14 is a functional block diagram rather than a listing of specific components.

Figure 15:
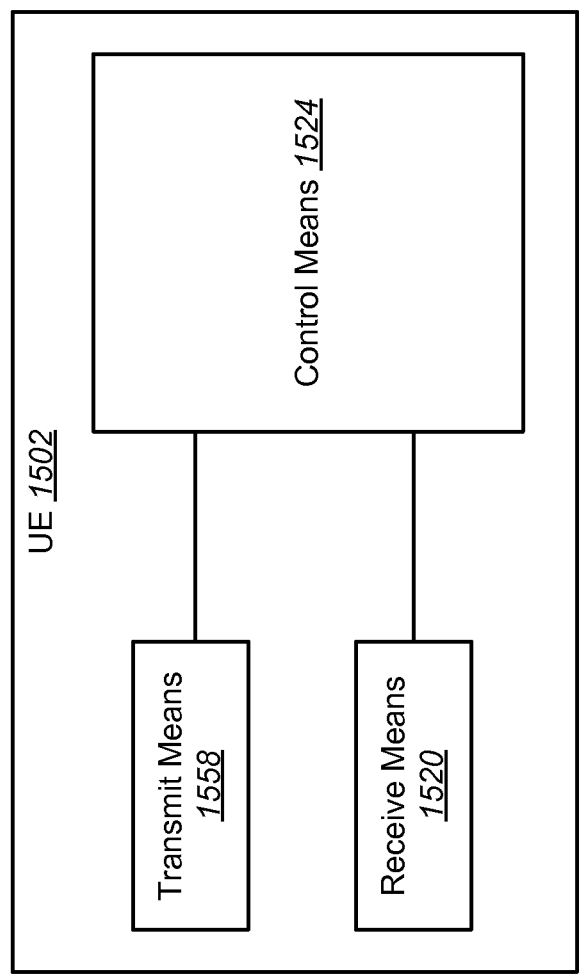
FIG. 15 is a block diagram illustrating one configuration of a UE in which systems and methods for sending feedback information may be implemented.

FIG. 15 is a block diagram illustrating one configuration of a UE 1502 in which systems and methods for sending feedback information may be implemented. The UE 1502 includes transmit means 1558, receive means 1520 and control means 1524. The transmit means 1558, receive means 1520 and control means 1524 may be configured to perform one or more of the functions described in connection with FIG. 2 above. FIG. 18 above illustrates one example of a concrete apparatus structure of FIG. 15. Other various structures may be implemented to realize one or more of the functions of FIG. 2. For example, a DSP may be realized by software.

Figure 16:
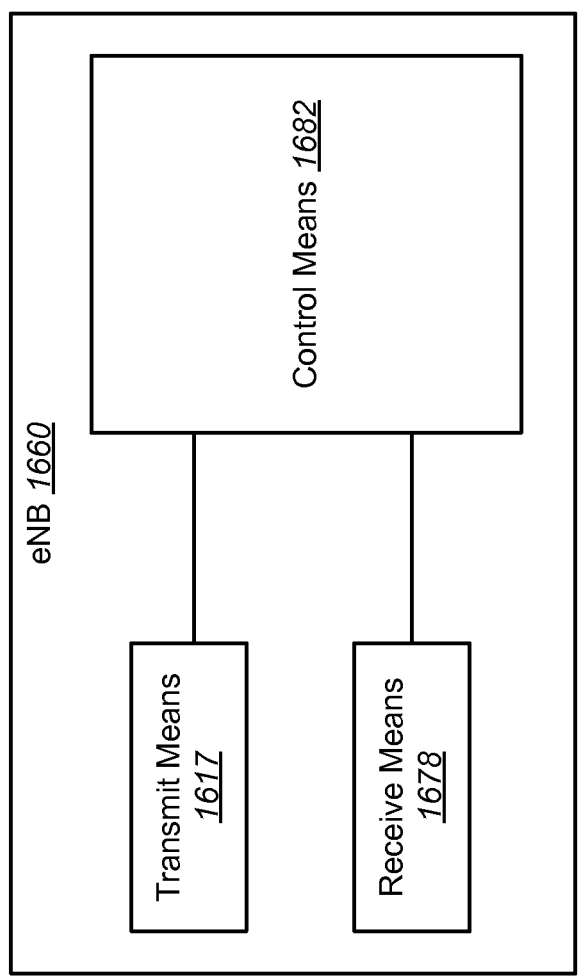
FIG. 16 is a block diagram illustrating one configuration of an eNB in which systems and methods for receiving feedback information may be implemented.

FIG. 16 is a block diagram illustrating one configuration of an eNB 1660 in which systems and methods for receiving feedback information may be implemented. The eNB 1660 includes transmit means 1617, receive means 1678 and control means 1682. The transmit means 1617, receive means 1678 and control means 1682 may be configured to perform one or more of the functions described in connection with FIG. 3 above. FIG. 19 above illustrates one example of a concrete apparatus structure of FIG. 16. Other various structures may be implemented to realize one or more of the functions of FIG. 3. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method for sending a power headroom report (PHR) by a user equipment (UE) in which (i) two media access control (MAC) entities are configured in Dual Connectivity, and (ii) a prohibitPHR-Timer is configured in each of the MAC entities, comprising:
    performing a power headroom reporting procedure if the prohibitPHR-Timer expires or has expired in each of the MAC entities, wherein the power headroom reporting procedure includes:
        obtaining, in each of the MAC entities, a value of a power headroom for each activated serving cell with configured uplink among a first set and a second set of serving cells;
        generating, in each of the MAC entities, a power headroom MAC control element for the Dual Connectivity based on the obtained values; and
        transmitting, in each of the MAC entities, the power headroom MAC control element; and
    operating one radio resource control (RRC) entity, wherein the configuration of the Dual Connectivity is done in the RRC entity.

2. The method of claim 1, wherein the first set of serving cells corresponds to a first evolved node B (eNB) and the second set of serving cells corresponds to a second eNB.

3. A method for receiving a power headroom report (PHR) by an evolved Node B (eNB), comprising:
    configuring Dual Connectivity in a user equipment (UE) so that (i) two media access control (MAC) entities are configured in Dual Connectivity, and (ii) a prohibit-PHR-Timer is configured in each of the MAC entities;
    performing a power headroom reporting procedure if the prohibitPHR-Timer expires or has expired in each of the MAC entities, wherein the power headroom reporting procedure includes:
        receiving, in each of the MAC entities, a power headroom MAC control element for the Dual Connectivity; and
        obtaining, in each of the MAC entities, a value of a power headroom for each activated serving cell with configured uplink among a first set and a second set of serving cells from the power headroom MAC control element; and
    operating one radio resource control (RRC) entity for the UE, wherein the Dual Connectivity is configured in the RRC entity.

4. The method of claim 3, wherein the first set of serving cells corresponds to the eNB and the second set of serving cells corresponds to another eNB.

5. A user equipment (UE) for sending a power headroom report (PHR), comprising:
    a processor; and
    memory in electronic communication with the processor, wherein (i) two media access control (MAC) entities are configured in Dual Connectivity, (ii) a prohibit-PHR-Timer is configured in each of the MAC entities, and (iii) instructions stored in the memory are executable to:

perform a power headroom reporting procedure if the prohibitPHR-Timer expires or has expired in each of the MAC entities, wherein the power headroom reporting procedure includes:

obtaining, in each of the MAC entities, a value of a power headroom for each activated serving cell with configured uplink among a first set and a second set of serving cells;

generating, in each of the MAC entities, a power headroom MAC control element for the Dual Connectivity based on the obtained values; and transmitting, in each of the MAC entities, the power headroom MAC control element; and operate one radio resource control (RRC) entity, wherein the configuration of the Dual Connectivity is done in the RRC entity.

6. The UE of claim 5, wherein the first set of serving cells corresponds to a first evolved node B (eNB) and the second set of serving cells corresponds to a second eNB.

7. An evolved Node B (eNB) for receiving a power headroom report (PHR), comprising:

a processor; and memory in electronic communication with the processor, wherein instructions stored in the memory are executable to:

configure Dual Connectivity in a user equipment (UE) so that (i) two media access control (MAC) entities are configured in Dual Connectivity, and (ii) a prohibitPHR-Timer is configured in each of the MAC entities;

perform a power headroom reporting procedure if the prohibitPHR-Timer expires or has expired in each of the MAC entities, wherein the power headroom reporting procedure includes:

receiving, in each of the MAC entities, a power headroom MAC control element for the Dual Connectivity; and obtaining, in each of the MAC entities, a value of a power headroom for each activated serving cell with configured uplink among a first set and a second set of serving cells from the power headroom MAC control element; and operate one radio resource control (RRC) entity for the UE, wherein the Dual Connectivity is configured in the RRC entity.

8. The eNB of claim 7, wherein the first set of serving cells corresponds to the eNB and the second set of serving cells corresponds to another eNB.

* * * * *